US008958124B2

(12) United States Patent
Ono

(10) Patent No.: US 8,958,124 B2
(45) Date of Patent: Feb. 17, 2015

(54) COLOR IMAGE FORMATION APPARATUS AND METHOD FOR CHANGING COLOR WHILE MAINTAINING INTENDED COLOR IN A PRINT JOB

(71) Applicant: Konica Minolta, Inc., Chiyoda-ku (JP)

(72) Inventor: Hiroko Ono, Toyonaka (JP)

(73) Assignee: Konica Minolta, Inc., Chiyoda-Ku, Tokyo (JP)

( * ) Notice: Subject to any disclaimer, the term of this patent is extended or adjusted under 35 U.S.C. 154(b) by 0 days.

(21) Appl. No.: 13/906,780

(22) Filed: May 31, 2013

(65) Prior Publication Data

US 2013/0342860 A1 Dec. 26, 2013

(30) Foreign Application Priority Data

Jun. 21, 2012 (JP) ................................. 2012-139867

(51) Int. Cl.
*H04N 1/60* (2006.01)
*G06F 3/12* (2006.01)

(52) U.S. Cl.
CPC .................. *G06F 3/12* (2013.01); *G06F 3/121* (2013.01); *G06F 3/1235* (2013.01); *G06F 3/1255* (2013.01); *G06F 3/1285* (2013.01)
USPC .......................................... 358/1.9; 358/518

(58) Field of Classification Search
None
See application file for complete search history.

(56) References Cited

U.S. PATENT DOCUMENTS

| | | | | |
|---|---|---|---|---|
| 7,038,812 | B2 * | 5/2006 | Hashimoto et al. | ............ 358/1.9 |
| 8,699,049 | B2 * | 4/2014 | Sugiyama | ................... 358/1.14 |
| 2004/0196331 | A1 * | 10/2004 | Zerza et al. | ...................... 347/43 |
| 2005/0259295 | A1 * | 11/2005 | Nagao | ............................. 358/2.1 |
| 2007/0003306 | A1 * | 1/2007 | Jacobsen et al. | ................. 399/79 |
| 2008/0180716 | A1 * | 7/2008 | Miyata | ......................... 358/1.13 |
| 2010/0149558 | A1 * | 6/2010 | Bostick et al. | ................. 358/1.9 |
| 2011/0157617 | A1 * | 6/2011 | Yamazaki | ..................... 358/1.14 |
| 2011/0286018 | A1 * | 11/2011 | Hashizume | .................... 358/1.9 |
| 2011/0317188 | A1 * | 12/2011 | Gondek et al. | ................. 358/1.9 |

FOREIGN PATENT DOCUMENTS

| | | |
|---|---|---|
| JP | 10-329337 A | 12/1998 |
| JP | 2004-020759 A | 1/2004 |
| JP | 2004-276335 A | 10/2004 |
| JP | 2007-124233 A | 5/2007 |

OTHER PUBLICATIONS

Japanese Office Action dated Sep. 2, 2014 issued in corresponding Japanese Patent Appln. No. 2012-139867, with English translation (7 pages).

* cited by examiner

*Primary Examiner* — Dung Tran
(74) *Attorney, Agent, or Firm* — Buchanan Ingersoll & Rooney PC

(57) ABSTRACT

A color image formation apparatus includes: a containing unit containing a plurality of developers; an image formation unit for performing an image formation process using at least a part of the plurality of developers; a control unit for causing the image formation unit to perform the image formation process with color change for at least one of colors designated by a job to be processed being made such that the image formation process can be performed using a developer not restricted in use when a part of the plurality of developers is restricted in use; and a reception unit for receiving designation of a change-prohibited color, which is a color not to be changed by the control unit. The control unit causes the image formation process to be performed while prohibiting, in the color change, change of the change-prohibited color of the colors designated by the job to be processed.

13 Claims, 20 Drawing Sheets

FIG.6

| YELLOW | EXIST |
| --- | --- |
| MAGENTA | EXIST |
| CYAN | NOT EXIST |
| BLACK | EXIST |

FIG.7

| YELLOW | 2mg |
| --- | --- |
| MAGENTA | 5mg |
| CYAN | 3mg |
| BLACK | 2mg |

FIG.14

| WHAT TO PRINT | STATUS OF COLOR TO BE USED | COUNTERMEASURE |
|---|---|---|
| LETTER/ CHARACTER | BLACK: SHORTAGE | PERFORM PRINT DOT THINNING EQUALLY IN ENTIRE PRINT DATA. MIX OTHER TONER(S) IN ORDER TO PREVENT DETERIORATION OF VIEWABILITY DUE TO TOO MUCH THINNING WHEN THINNING OF 50% OR MORE IS PERFORMED. |
| | BLACK: NON-EXISTENCE | AS SHOWN IN FIG. 17, MAP ALL THE UTILIZED COLORS EXCEPT BLACK IN HUE CIRCLE. AS ALTERNATIVE COLOR, SELECT COLOR FARTHEST THEREFROM AND CLOSE TO COMPLEMENTARY COLOR. |
| | CYAN, MAGENTA, YELLOW: SHORTAGE | PERFORM PRINT DOT THINNING EQUALLY IN ENTIRE PRINT DATA. APPLY RULE OF BELOW-DESCRIBED CASE WHERE "CYAN, MAGENTA, AND YELLOW DO NOT EXIST" IN ORDER TO PREVENT DETERIORATION OF VIEWABILITY DUE TO TOO MUCH THINNING WHEN THINNING OF 50% OR MORE IS PERFORMED. |
| | CYAN, MAGENTA, YELLOW: NON-EXISTENCE | AS SHOWN IN FIG. 18, AS ALTERNATIVE COLOR, EMPLOY PRINTABLE COLOR CLOSEST THERETO CLOCKWISELY IN HUE CIRCLE. PRINT USING ALTERNATIVE COLOR. |

FIG.15

| WHAT TO PRINT | STATUS OF COLOR TO BE USED | COUNTERMEASURE |
|---|---|---|
| GRAPH | BLACK: SHORTAGE | AS ALTERNATIVE COLOR, EMPLOY TONER NOT IN USE AND HAVING LARGEST REMAINING AMOUNT. PRINT USING ALTERNATIVE COLOR. |
| | BLACK: NON-EXISTENCE | AS ALTERNATIVE COLOR, EMPLOY TONER NOT IN USE AND HAVING LARGEST REMAINING AMOUNT. PRINT USING ALTERNATIVE COLOR. |
| | CYAN, MAGENTA, YELLOW: SHORTAGE | AS SHOWN IN FIG. 19, MAP ALL THE COLORS ADJACENT TO NON-EXISTENT COLOR IN HUE CIRCLE. AS ALTERNATIVE COLOR, SELECT COLOR FARTHEST THEREFROM AND CLOSE TO COMPLEMENTARY COLOR. |
| | CYAN, MAGENTA, YELLOW: NON-EXISTENCE | AS SHOWN IN FIG. 19, MAP ALL THE COLORS ADJACENT TO NON-EXISTENT COLOR IN HUE CIRCLE. AS ALTERNATIVE COLOR, SELECT COLOR FARTHEST THEREFROM AND CLOSE TO COMPLEMENTARY COLOR. |

FIG.16

| WHAT TO PRINT | STATUS OF COLOR TO BE USED | COUNTERMEASURE |
|---|---|---|
| PHOTOGRAPH | BLACK: SHORTAGE | PERFORM MONOCHROME PRINTING USING COLOR HAVING LARGEST REMAINING AMOUNT. |
| | BLACK: NON-EXISTENCE | PERFORM MONOCHROME PRINTING USING COLOR HAVING LARGEST REMAINING AMOUNT. |
| | CYAN, MAGENTA, YELLOW: SHORTAGE | PERFORM MONOCHROME PRINTING USING COLOR HAVING LARGEST REMAINING AMOUNT. |
| | CYAN, MAGENTA, YELLOW: NON-EXISTENCE | PERFORM MONOCHROME PRINTING USING COLOR HAVING LARGEST REMAINING AMOUNT. |

COLOR IMAGE FORMATION APPARATUS AND METHOD FOR CHANGING COLOR WHILE MAINTAINING INTENDED COLOR IN A PRINT JOB

This application is based on Japanese Patent Application No. 2012-139867 filed with the Japan Patent Office on Jun. 21, 2012, the entire content of which is hereby incorporated by reference.

BACKGROUND OF THE INVENTION

1. Field of the Invention

The present invention relates to a color image formation apparatus, a color image formation system, a color image processing method, and a non-transitory storage medium having a color image processing program stored therein, so as to perform an image formation process using at least a part of a plurality of developers of different colors.

2. Description of the Related Art

In an image formation apparatus employing a plurality of developers of different colors (such as color toners or color inks), printing presumably cannot be performed when running out of a developer or the like during the printing. In order to avoid such a circumstance in which printing cannot be performed, Japanese Laid-Open Patent Publication No. 2004-276335 discloses a technique of printing in which colors designated by print data are changed when a remaining amount of a specific developer is small.

The image formation apparatus of the above-described conventional technique indiscriminately changes the colors designated by the print data and prints them. Accordingly, color change unintended for the user may be made, disadvantageously.

SUMMARY OF THE INVENTION

An object of a certain aspect is to provide a color image formation apparatus, a color image formation system, a color image processing method, and a non-transitory storage medium having a color image processing program stored therein, so as to achieve continued image formation while maintaining an original color in accordance with an user's intention as much as possible even when a remaining amount of a specific developer is small.

According to a certain aspect of the present embodiment, there is provided a color image formation apparatus including: a containing unit configured to contain a plurality of developers of different colors; an image formation unit configured to perform an image formation process using at least a part of the plurality of developers; a control unit configured to cause the image formation unit to perform the image formation process with color change for at least one of colors designated by a job to be processed being made such that the image formation process is able to be performed using a developer not restricted in use in a case where a part of the plurality of developers is restricted in use; and a reception unit configured to receive designation of a change-prohibited color, which is a color not to be changed by the control unit, the control unit being configured to cause the image formation process to be performed while prohibiting, in the color change, change of the change-prohibited color of the colors designated by the job to be processed.

Preferably, the job to be processed includes a job that instructs the image formation process for a plurality of pages, and the control unit is configured to selectively perform an operation in a mode of maintaining the change-prohibited color for all of the plurality of pages, or an operation in a mode of maintaining the change-prohibited color for a designated page of the plurality of pages.

Preferably, the reception unit is configured to provide a notification that urges to change the change-prohibited color designated previously, when the image formation unit is not able to perform the image formation process with the change-prohibited color being maintained.

Preferably, the reception unit is configured to display, on a display unit, an image defined by the job to be processed, and to receive designation of the change-prohibited color in the image.

Preferably, the reception unit is configured to receive, as the change-prohibited color, a color of a pixel designated in the image displayed.

Preferably, the reception unit is configured to receive, as the change-prohibited color, a color within a region designated in the image displayed.

Preferably, the reception unit is configured to receive, as the change-prohibited color, a color of a partial image designated in the image displayed.

Preferably, the reception unit is configured to display, on a display unit, an image for receiving selection of the change-prohibited color.

Preferably, the case where the part of the plurality of developers is restricted in use includes a case where a remaining amount of the part of the developers is less than a predetermined amount set in advance.

Preferably, the change-prohibited color includes a color approximate to the change-prohibited color.

According to another aspect of the present embodiment, a color image formation system includes: a color image formation apparatus; and an information processing apparatus configured to transmit a job to be processed, to the color image formation apparatus. The color image formation apparatus includes: a containing unit configured to contain a plurality of developers of different colors; an image formation unit configured to perform an image formation process using at least a part of the plurality of developers; and a control unit configured to cause the image formation unit to perform the image formation process with color change for at least one of colors designated by the job to be processed being made such that the image formation process is able to be performed using a developer not restricted in use in a case where a part of the plurality of developers is restricted in use. The information processing apparatus includes a reception unit configured to receive designation of a change-prohibited color, which is a color not to be changed by the control unit. The control unit is configured to cause the image formation process to be performed while prohibiting, in the color change, change of the change-prohibited color of the colors designated by the job to be processed.

According to still another aspect of the present embodiment, a color image processing method employing at least a part of a plurality of contained developers of different colors includes: making color change for at least one of colors, designated by a job to be processed, such that an image formation process is able to be performed using a developer not restricted in use in a case where a part of the plurality of developers is restricted in use; and receiving designation of a change-prohibited color, which is a color not to be changed. Making the color change includes prohibiting, in the color change, change of the change-prohibited color of the colors designated by the job to be processed, when the change-prohibited color is designated.

According to yet another aspect of the present embodiment, a non-transitory storage medium having an image processing program for performing an image formation process using at least a part of a plurality of contained developers of different colors causes a computer to: make color change for at least one of colors, designated by a job to be processed, such that the image formation process is able to be performed using a developer not restricted in use in a case where a part of the plurality of developers is restricted in use; and receive designation of a change-prohibited color, which is a color not to be changed. Making the color change includes prohibiting, in the color change, change of the change-prohibited color of the colors designated by the job to be processed, when the change-prohibited color is designated.

With the color image formation system, the color image formation apparatus, the color image processing method, and the non-transitory storage medium having the color image processing program stored therein in accordance with the present embodiment, even when a developer is restricted in use, an image is formed while maintaining the original color of at least a designated color.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6 shows an exemplary result of detection as to existence/non-existence of toner of each color.

FIG. 7 shows an exemplary required amount of toner of each color.

FIG. 14 shows an exemplary rule in a case of printing letters/characters.

FIG. 15 shows an exemplary rule in a case of printing a graph.

FIG. 16 shows an exemplary rule in a case of printing a photograph.

DESCRIPTION OF THE PREFERRED EMBODIMENTS

Figure 1:
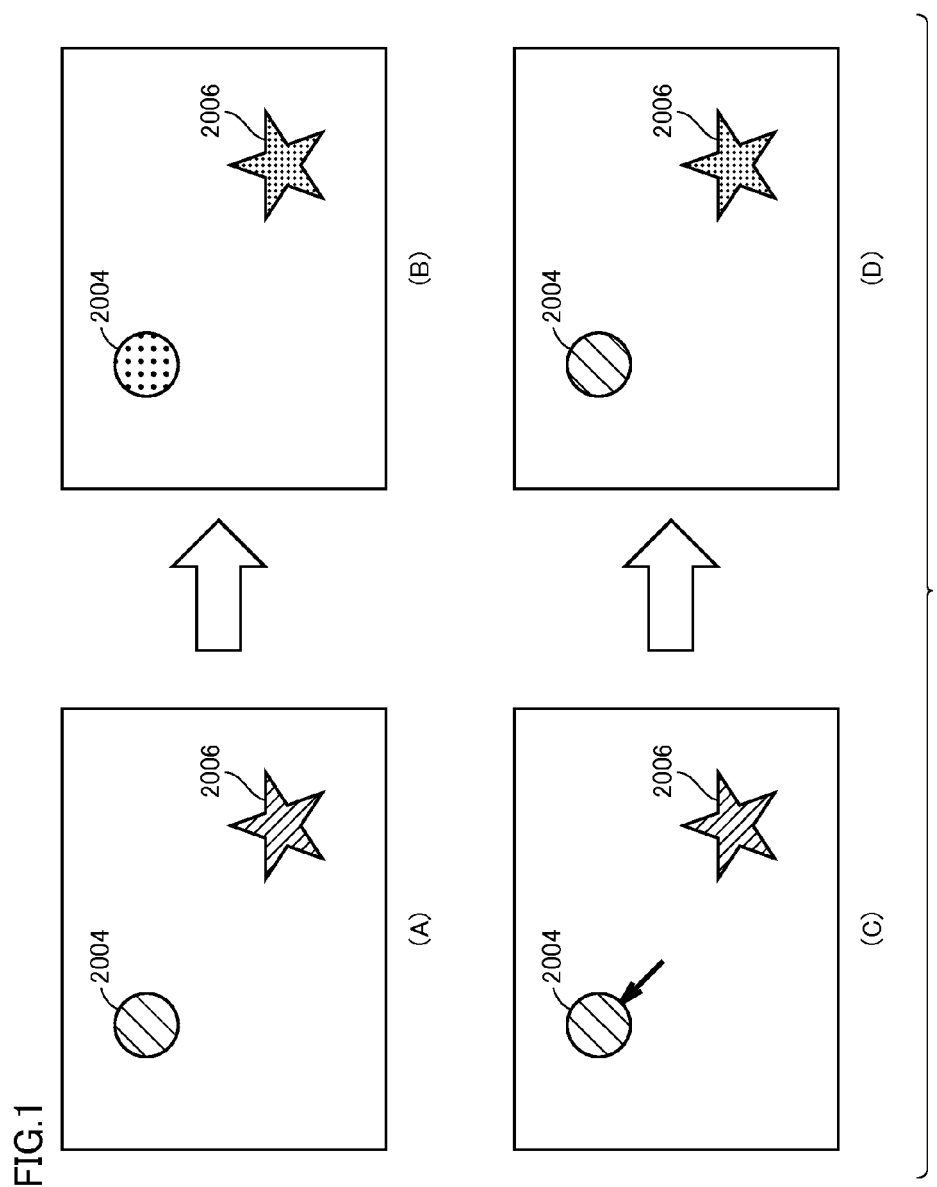
FIG. 1 illustrates an overview of the present embodiment.

The following describes embodiments for implementing the invention. It should be noted that components having the same functions and steps in which the same process is performed are given the same reference characters and are not described repeatedly.

Overview of Present Embodiment

Referring to FIG. 1, the following describes an overview of the present embodiment. FIG. 1 shows image examples, in which colors to be printed are changed due to shortage of a toner or the like by an image formation apparatus associated with the present embodiment and an image formation apparatus according to the present embodiment.

An image example (A) in FIG. 1 represents images before the color change by the image formation apparatus associated with the present embodiment. An image example (B) in FIG. 1 represents images after the color change by the image formation apparatus associated with the present embodiment. An image example (C) in FIG. 1 represents images before the color change by the image formation apparatus according to the present embodiment. An image example (D) in FIG. 1 represents images after the color change by the image formation apparatus according to the present embodiment. It should be noted that the image example (A) in FIG. 1 and the image example (C) in FIG. 1 are the same.

As shown in the image examples (A) and (B) in FIG. 1, the image formation apparatus associated with the present embodiment indiscriminately changes the colors of all the images 2004, 2006 and prints them.

On the other hand, as shown in the image example (C) in FIG. 1, in the image formation apparatus according to the present embodiment, a color not to be changed can be designated by a user. In the image example (C) in FIG. 1, the user designates image 2004. Accordingly, as shown in the image example (D) in FIG. 1, the image formation apparatus according to the present embodiment performs printing with the color of image 2004 being unchanged (without changing the color thereof). In other words, the image formation apparatus according to the present embodiment performs printing while maintaining the color of image 2004.

Accordingly, in the image formation apparatus according to the present embodiment, the user can designate a color not to be changed. As a result, the image formation apparatus can print an image without color change unintended for the user.

First Embodiment

<Hardware Configuration>

Figure 2:
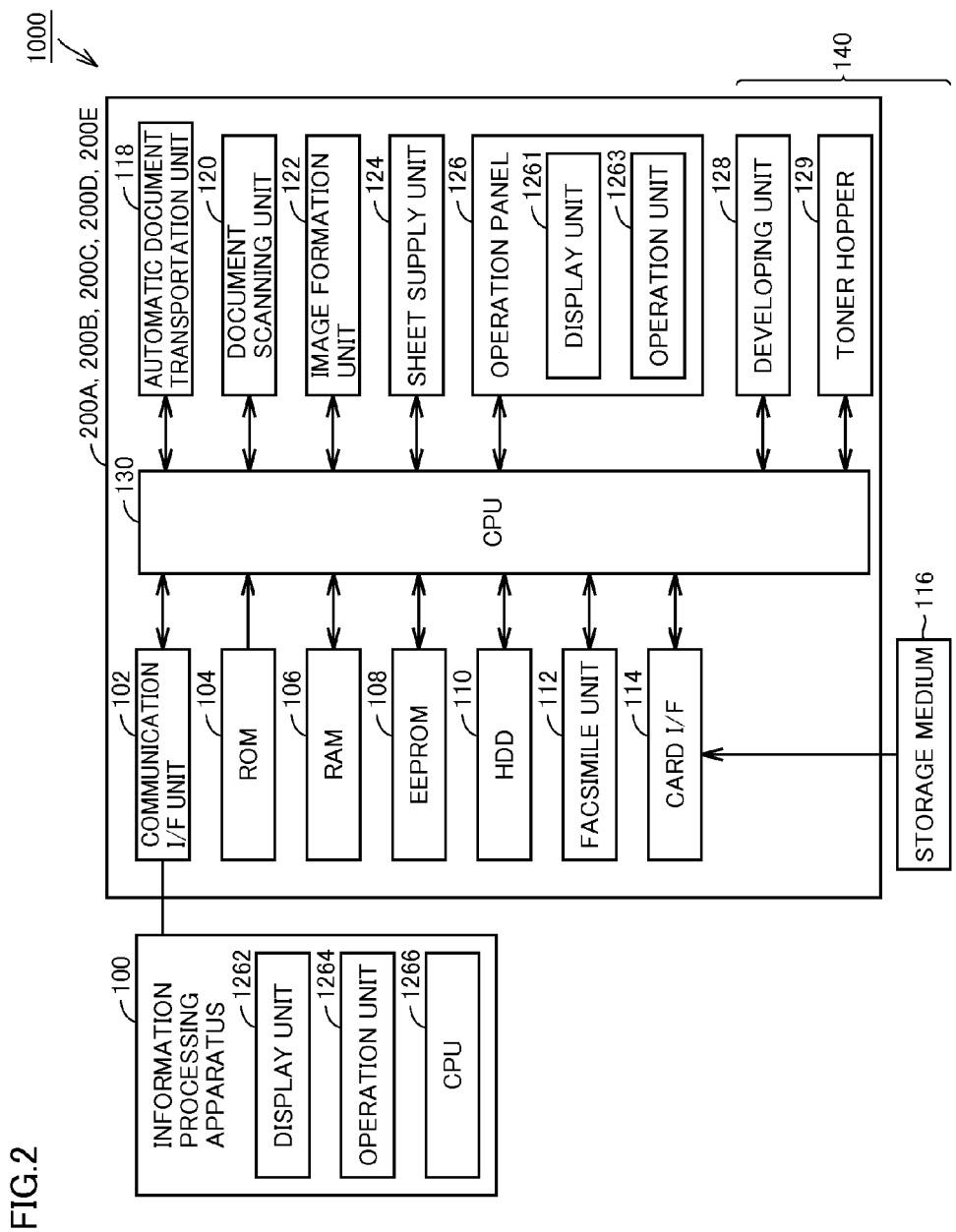
FIG. 2 shows an exemplary hardware configuration of an image formation apparatus of a first embodiment.

Referring to FIG. 2, the following describes an image formation system 1000, an information processing apparatus 100, and an image formation apparatus 200A in a first embodiment. In the example of FIG. 2, image formation system 1000 includes information processing apparatus 100 and image formation apparatus 200A. FIG. 2 also shows exemplary hardware configurations of information processing apparatus 100 and image formation apparatus 200A.

Image formation apparatus 200A forms a color image or a monochrome image on a recording medium using at least a part of developers of a plurality of colors. Examples of image formation apparatus 200 include a printer, a facsimile, a copying apparatus, a plotter, a multi-functional peripheral of these, and the like. In the case where the image formation apparatus employs an electrophotography method, the developers are toners. On the other hand, in the case where the image formation apparatus employs an ink jet method, the developers are inks. It should be noted that in the present embodiment, the image formation apparatus may be a color image formation apparatus capable of forming a color image.

Examples of the recording medium include a sheet of paper, a thread, a fiber, a leather, a metal, a plastic, a glass, a wood, a ceramic, and the like. Examples of the image include a sign, a letter/character, a drawing, a combination of at least two of them, and the like.

Examples of information processing apparatus 100 include a PC (Personal Computer), a mobile phone, a smart phone, a tablet, a display device, a white board, and the like.

In the description below, it is assumed that image formation apparatus 200 employs the color electrophotography method as a typical example. In this case, "toners" are employed as the developers. As the plurality of colors, the following four colors are employed: yellow, magenta, cyan, and black. As the recording medium, a "sheet of paper" is employed. It should be noted that the "image formation process" is also referred to as "printing".

Image formation apparatus 200A includes a communication I/F unit 102, a ROM (Read Only Memory) 104, a RAM (Random Access Memory) 106, an EEPROM (Electronically Erasable and Programmable Read Only Memory) 108, a HDD (Hard Disk Drive) 110, a facsimile unit 112, a card I/F unit 114, an automatic document transportation unit 118, a document scanning unit 120, an image formation unit 122, a sheet supply unit 124, an operation panel 126, a containing unit 140, and a CPU (Central Processing Unit) 130.

Communication I/F unit 102 is an interface that connects image formation apparatus 200A to a data transmission path such as a network or a facsimile.

A program, which is executed when image formation apparatus 200A is activated, and various types of data are stored in ROM 104.

In RAM 106, various types of programs and data read from ROM 104 or HDD 110 are temporarily held.

Various types of programs and various types of data are stored in HDD 110. Examples of the various types of data include: received document data or scanned image data to be handled by image formation apparatus 200A; and data to be used by each application.

Facsimile unit 112 performs facsimile transmission of image data or the like to a terminal apparatus of its counterpart, using communication I/F unit 102.

Card I/F unit 114 is an interface between image formation apparatus 200A and a storage medium 116. Various types of data from storage medium 116 are supplied via card I/F unit 114 and are stored in HDD 17 or the like.

Automatic document transportation unit 118 automatically transports a document, which is set by the user, to document scanning unit 120.

Document scanning unit 120 optically scans a document disposed on the scanning plane of document scanning unit 120, so as to generate image data.

Image formation unit 122 performs printing on, for example, a sheet of paper. In the case where image formation apparatus 200A employs the electrophotography method, image formation unit 122 is a photo conductor drum or the like. In the case where image formation apparatus 200A employs the ink jet method, image formation unit 122 is a recording head or the like.

Operation panel 126 is a touch panel type display including a display unit 1261 and an operation unit 1263. Operation unit 1263 is composed of hard keys or the like, and receives a user's input for each operation onto image formation apparatus 200A. Display unit 1261 is composed of a display or the like, and displays various types of information regarding the image formation operation, for example.

Containing unit 140 contains toners of respective colors (here, yellow, magenta, cyan, and black). Image formation unit 122 performs a printing process using the toners thus contained in the containing unit.

Further, containing unit 140 includes a developing unit 128 and a toner hopper 129. In the image formation apparatus according to the present embodiment, the electrophotography method is employed. Developing unit 128 adheres a developer to a photo conductor (not shown) for the purpose of development. Developing unit 128 can contain a small amount of toner of each color. Further, developing unit 128 is included in image formation unit 122.

Meanwhile, toner hopper 129 contains a larger amount of toner of each color than that of developing unit 128. When the density or amount of toner contained in developing unit 128 is decreased, toner hopper 129 supplies developing unit 128 with the toner under control of CPU 130. Further, developing unit 128 may serve as a first containing unit and toner hopper 129 may serve as a second containing unit.

Further, when receiving a job via communication I/F unit 102, CPU 130 interprets print data contained in the job, and generates a bitmap image, for example. CPU 130 causes image formation unit 122 to print the bitmap image. Other processes by CPU 130 will be described later.

Further, information processing apparatus 100 includes a display unit 1262, an operation unit 1264, and a CPU 1266. Display unit 1262 displays information transmitted from image formation apparatus 200A. Operation unit 1264 receives various types of information from the user (such as an input of the above-described change-prohibited color). CPU 1266 generally controls information processing apparatus 100.

<Process Flow>

Figure 3:
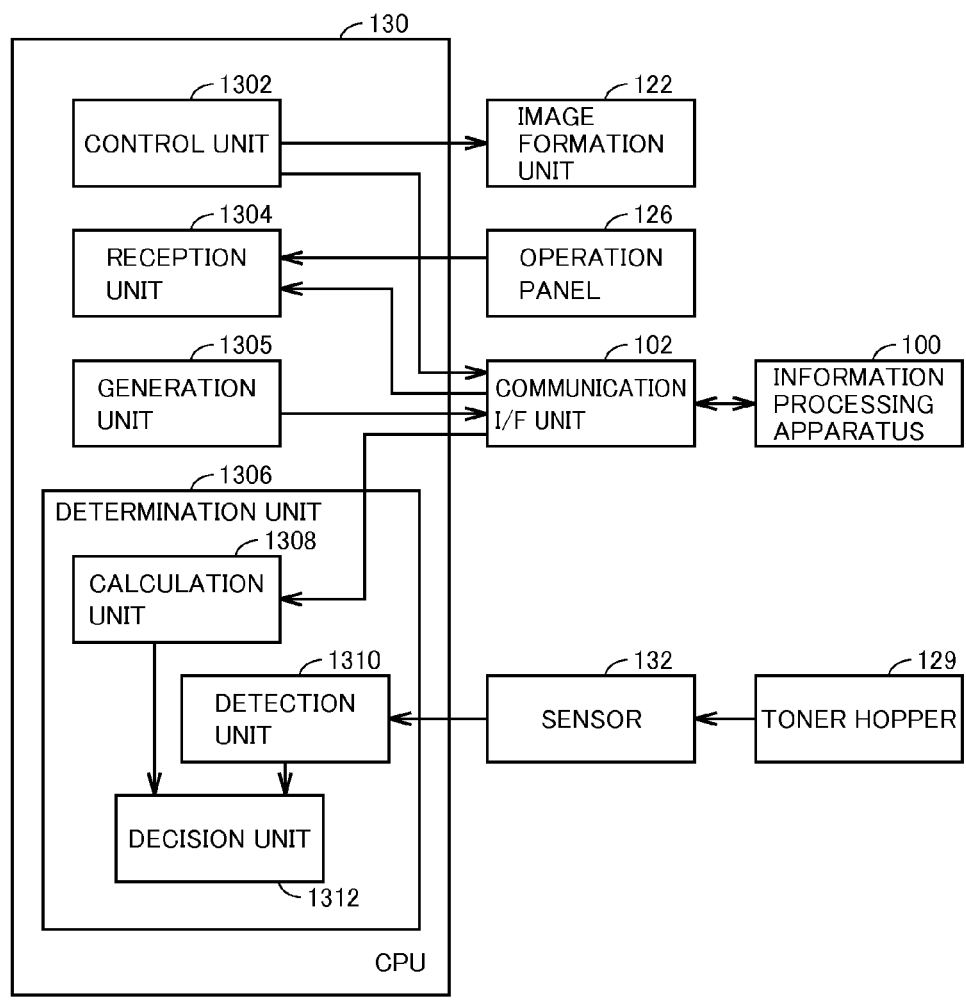
FIG. 3 shows an exemplary function configuration of a CPU in the first embodiment.
Figure 4:
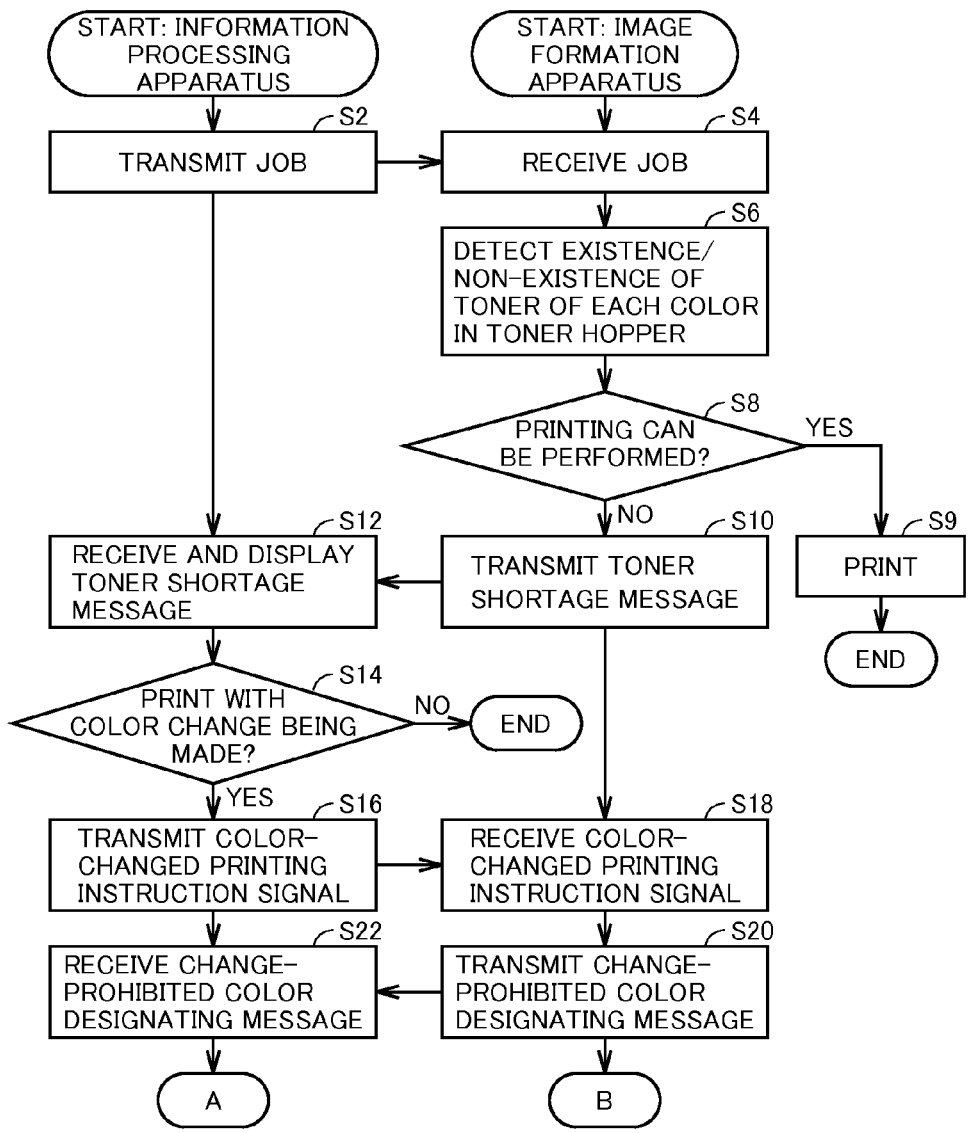
FIG. 4 shows an exemplary earlier part of a process flow in the image formation apparatus of the first embodiment.
Figure 5:
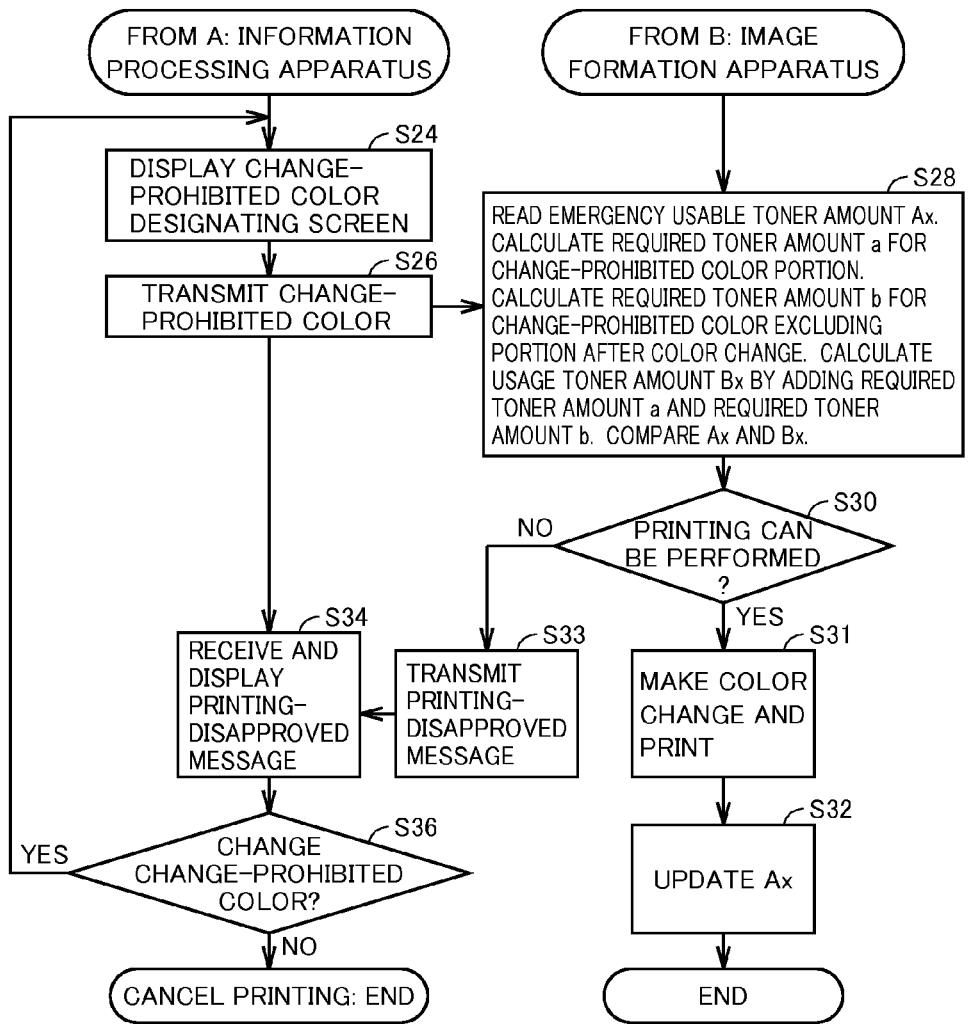
FIG. 5 shows an exemplary later part of the process flow in the image formation apparatus of the first embodiment.

Referring to FIG. 3 to FIG. 5, the following describes a process flow. With reference to FIG. 3, an exemplary functional configuration of CPU 130 will be described. Also, with reference to FIG. 4 and FIG. 5, an exemplary process flow in image formation apparatus 200A of the first embodiment will be described.

As shown in FIG. 3, CPU 130 implements a control unit 1302, a reception unit 1304, a generation unit 1305, and a determination unit 1306. Further, determination unit 1306 implements a calculation unit 1308, a detection unit 1310, and a decision unit 1312.

Using operation unit 1264 (such as a keyboard or a mouse), the user provides information processing apparatus 100 with an instruction to generate a job for causing image formation apparatus 200A to print an image. Accordingly, in a step S2, information processing apparatus 100 generates the job as instructed, and transmits it to image formation apparatus 200A.

The job includes: image data regarding the image to be formed by image formation apparatus 200A; color data indicating a color of the image; density data indicating density of the image; and the like. The image to be printed by image formation apparatus 200A as designated by the job is referred to as "designated image". Further, the color of the image as designated by the job is referred to as "designated color". The density of the image as designated by the job is referred to as "designated density".

In a step S4, communication I/F unit 102 of image formation apparatus 200A receives the job.

In a step S6, a sensor 132 detects existence/non-existence of each of the plurality of toners (toners of the plurality of colors) contained in toner hopper 129. Sensor 132 is attached to the bottom surface of toner hopper 129. For example, sensor 132 is an optical sensor. Sensor 132 emits light to the toner containing portion, and analyzes its reflecting light, thereby detecting existence/non-existence of each of the toners of the plurality of colors.

From sensor 132, detection unit 1310 obtains the detection result for each color, which has been detected by sensor 132 (i.e., result indicating existence/non-existence of the toner of each color). The detection result thus obtained by detection unit 1310 is temporarily stored in RAM 106. Meanwhile, CPU 130 restricts use of a toner of a color not contained in toner hopper 129. FIG. 6 shows an exemplary detection result for each color as detected by sensor 132. As shown in FIG. 6, the following describes a case where detection unit 1310 obtains a detection result indicating that the toner of cyan is not contained in toner hopper 129. Further, such a toner not contained in toner hopper 129 is referred to as "toner restricted in use".

In a step S8, decision unit 1312 determines whether or not printing can be performed. Specifically, when decision unit 1312 determines that a toner is restricted in use, decision unit 1312 determines that printing cannot be performed (NO in step S8). Further, when decision unit 1312 determines that no toner is restricted in use, decision unit 1312 determines that printing can be performed (YES in step S8).

When decision unit 1312 determines that printing can be performed (YES in step S8), the process proceeds to a step S9. In step S9, based on the input job, image formation unit 122 performs printing (while keeping the designated image, the designated color, the designated density, and the designated size), and then the process is ended.

On the other hand, when decision unit 1312 determines that printing cannot be performed (NO in step S8), the process proceeds to a step S10. In the example below, it is assumed that detection unit 1310 has obtained a detection result indicating that no cyan color is contained in toner hopper 129.

In step S10, generation unit 1305 generates a message (hereinafter, referred to as "toner shortage message") indicating shortage of a toner (cyan toner in this example), and transmits it to information processing apparatus 100 via communication I/F unit 102.

In a step S12, information processing apparatus 100 receives the toner shortage message thus transmitted. Further, information processing apparatus 100 provides the user with a notification of the toner shortage message thus received. Here, for example, the notification of the toner shortage message may be provided in the following manner: the toner shortage message is displayed on display unit 1262 of information processing apparatus 100; the toner shortage message is auditorily presented by information processing apparatus 100; or the like.

Figure 8:
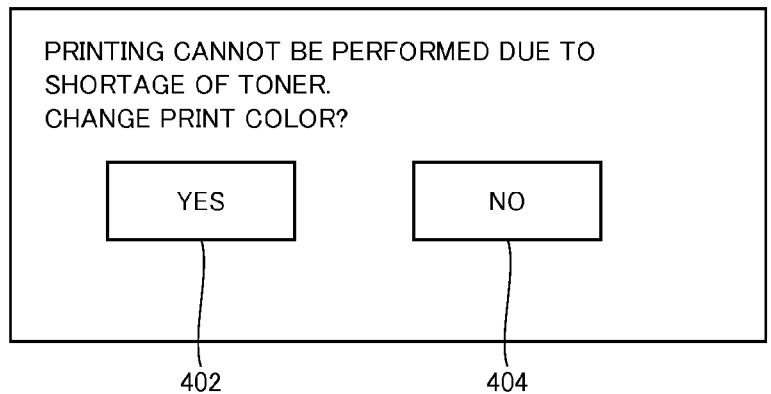
FIG. 8 shows exemplary display indicating that printing cannot be performed.

FIG. 8 shows an exemplary display screen displayed on display unit 1262 in step S12. When the user wishes to cause image formation unit 122 to perform the color-changed printing as described above, the user selects a YES button 402 using operation unit 1264 (mouse or the like). On the other hand, when the user does not wish to cause image formation unit 122 to perform the color-changed printing as described above, the user selects a NO button 404 using operation unit 1264. Further, in the case where information processing apparatus 100 has a touch panel function (i.e., in the case where display unit 1262 and operation unit 1264 are integrated), the user touches YES button 402 or NO button 404 by finger. Hereinafter, the clicking, touching, or the like is simply referred to as "clicking or similar operation".

When CPU 1266 of information processing apparatus 100 determines that the user has performed a clicking or similar operation onto NO button 404 (NO in step S14), the process is ended. On the other hand, when CPU 1266 of information processing apparatus 100 determines that the user has performed a clicking or similar operation onto YES button 402 (i.e., when the user wishes to cause image formation apparatus 200A to perform color-changed printing) (YES in step S14), the process proceeds to a step S16.

In step S16, CPU 1266 of information processing apparatus 100 generates a color-changed printing instruction signal, which is a command signal for causing image formation apparatus 200A to perform color-changed printing. Then, CPU 1266 of information processing apparatus 100 transmits the color-changed printing instruction signal to image formation apparatus 200A.

In a step S18, image formation apparatus 200A receives the color-changed printing instruction signal via communication I/F unit 102. The process proceeds to a step S20.

In step S20, generation unit 1305 generates a change-prohibited color designating message, and transmits it to information processing apparatus 100. The change-prohibited color designating message includes: (data of) a preview image of the image to be printed by image formation apparatus 200A; (data of) a change-prohibited color designated image described below and illustrated in FIG. 9; and the like. The change-prohibited color is a color not to be changed by control unit 1302.

In a step S22, information processing apparatus 100 receives the change-prohibited color designating message. The process proceeds to a step S24 illustrated in FIG. 5.

Figure 9:
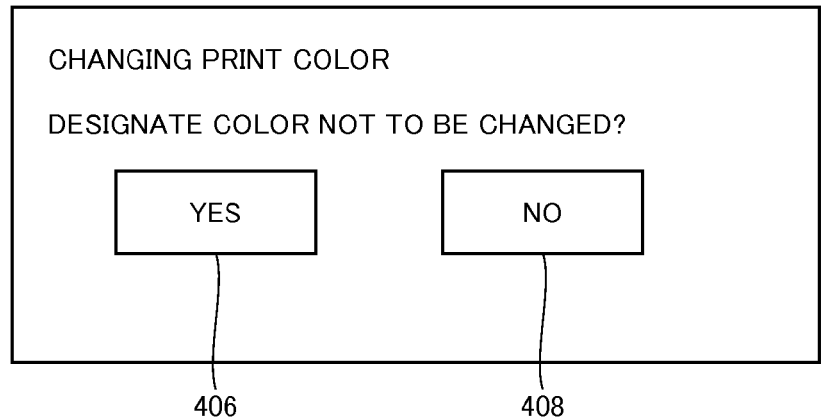
FIG. 9 shows an exemplary change-prohibited color designating screen.

In step S24, CPU 1266 of information processing apparatus 100 displays, on display unit 1262, a change-prohibited color designating screen contained in the change-prohibited color designating message. FIG. 9 shows an exemplary change-prohibited color designating screen. The example in FIG. 9 represents a screen for receiving the user's input as to whether to designate a change-prohibited color. When the user selects to designate a change-prohibited color, the user performs a clicking or similar operation onto YES button 406. When the user selects not to designate a change-prohibited color, the user performs a clicking or similar operation onto NO button 408.

When CPU 1266 of information processing apparatus 100 determines that NO button 408 has been clicked or touched by the user, the process is ended. On the other hand, when CPU 1266 of information processing apparatus 100 determines that YES button 406 has been clicked or touched by the user, CPU 1266 of information processing apparatus 100 displays a selection screen shown in FIG. 10.

Figure 10:
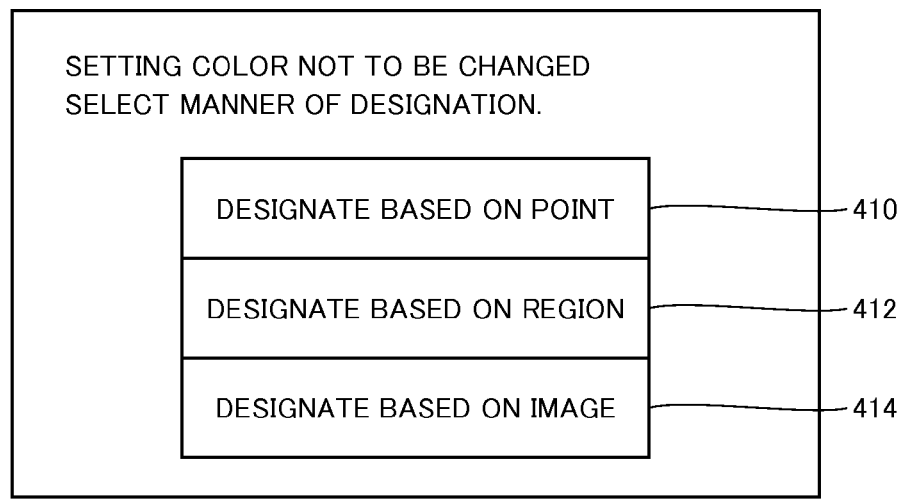
FIG. 10 shows an exemplary selection screen.

FIG. 10 shows an exemplary selection screen. The example in FIG. 10 represents a screen with which the user selects a manner of designating a color (change-prohibited color) not to be changed. In the example of FIG. 10, the user can select a manner of designating a change-prohibited color, from among the following manners: "designating based on a point", "designating based on a region", and "designating based on an image". The user can select a desired manner of designating, by performing a clicking or similar operation onto one of buttons 410, 412, 414. For example, the user can select the manner of "designating based on a point", by performing a clicking or similar operation onto button 410. Likewise, the user can select the manner of "designating based on a region", by performing a clicking or similar operation onto button 412. Likewise, the user can select the manner of "designating based on an image", by performing a clicking or similar operation onto button 414. The following describes each of the above-described manners.

<As to Case of "Designating Change-Prohibited Color Based on Point">

Figure 11:
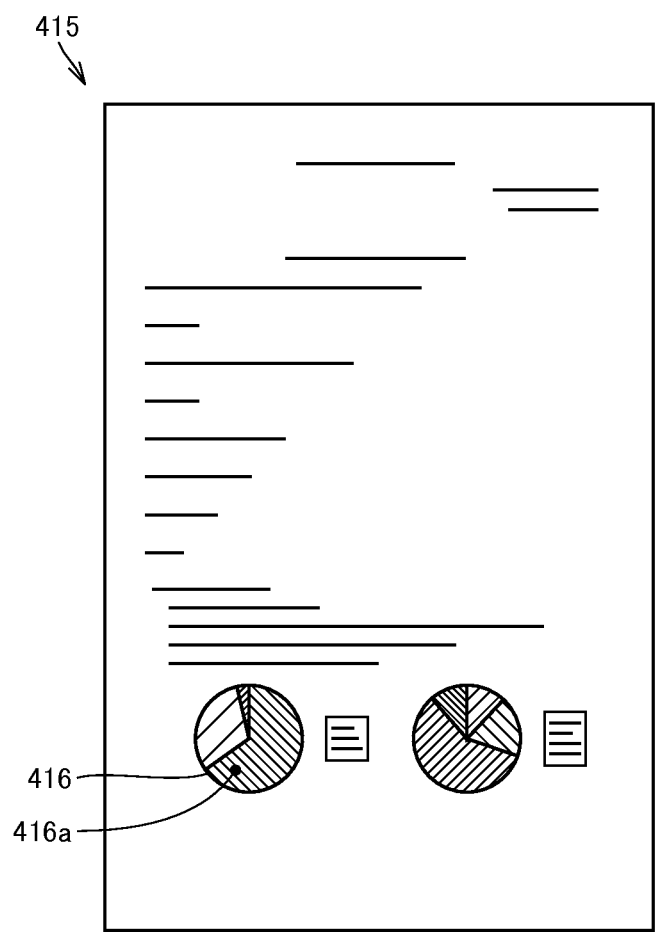
FIG. 11 shows an exemplary preview image.

Described first is the case where the user designates a change-prohibited color based on a point. When the user performs a clicking or similar operation onto button 410 for "designating based on a point" as shown in FIG. 10, information processing apparatus 100 displays a preview image 415 on display unit 1262. FIG. 11 shows an exemplary preview image 415. Preview image 415 in FIG. 11 includes a text document and circle graph images.

When the user designates a pixel (point) in the preview image while viewing preview image 415, information processing apparatus 100 receives the color of the designated pixel as a change-prohibited color. This designation is performed by the user performing a clicking or similar operation. By selecting a color to be maintained from the all pixels in preview image 415, the user designates a pixel having the color to be maintained. Information processing apparatus 100 receives the color of the designated pixel as a change-prohibited color.

Here, it is assumed that the user has designated a pixel 416*a* in an image 416 of a portion of a circle graph within preview image 415. Information processing apparatus 100 reads the color of pixel 416*a* thus designated, and receives the color thus read. With the user's designation of pixel 416*a*, image formation apparatus 200A can perform color-changed printing while maintaining the color of image 416 continuously including the color of pixel 416*a*, as described below.

<As to Case of "Designating Change-Prohibited Color(s) Based on Region">

Described next is the case of "designating change-prohibited color(s) based on a region". When the user performs a clicking or similar operation onto button 412 for "designating based on a region" as shown in FIG. 10, information processing apparatus 100 displays a preview image on display unit 1262.

Figure 12:
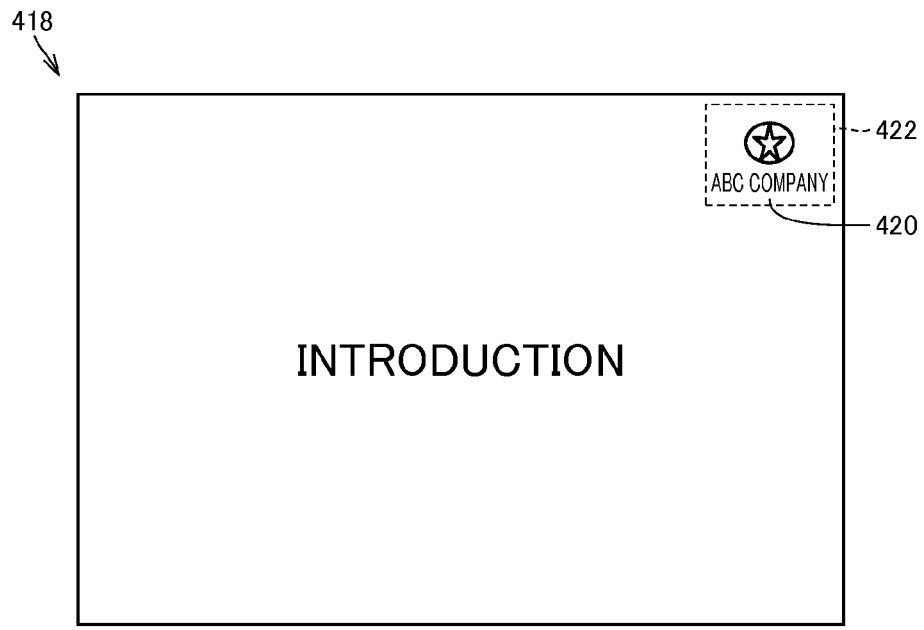
FIG. 12 shows an exemplary preview image in another example.

FIG. 12 shows a preview image 418 displayed on display unit 1262 by information processing apparatus 100 in this case. When the user designates a region while viewing preview image 418, the user can designate the color(s) of pixels in the designated region as change-prohibited color(s).

FIG. 12 shows a case where the user designates a logo mark 420 of the "ABC company" shown in the upper right portion of FIG. 12. In the example of FIG. 12, the region designated by the user is illustrated by a broken line. This broken line may be referred to as boundary line 422 or may be referred to as region 422.

When the user surrounds the region therewith using operation unit 1264 (such as a mouse) or the user's finger, information processing apparatus 100 displays, on display unit 1262, the trajectory of the mouse or user's finger as boundary line 422.

Thus, by the user designating the region with boundary line 422, information processing apparatus 100 receives the color(s) of the plurality of pixels in the region as change-prohibited color(s). With the user's designation with boundary line 422, image formation apparatus 200A can perform color-changed printing while maintaining the color(s) of the pixels within boundary line 422, as described below.

<As to Case of "Designating Change-Prohibited Color(s) Based on Image">

Described next is the case of "designating change-prohibited color(s) based on an image". When the user performs a clicking or similar operation onto button 414 for "designating based on an image" as shown in FIG. 10, information processing apparatus 100 displays a preview image on display unit 1262.

Figure 13:
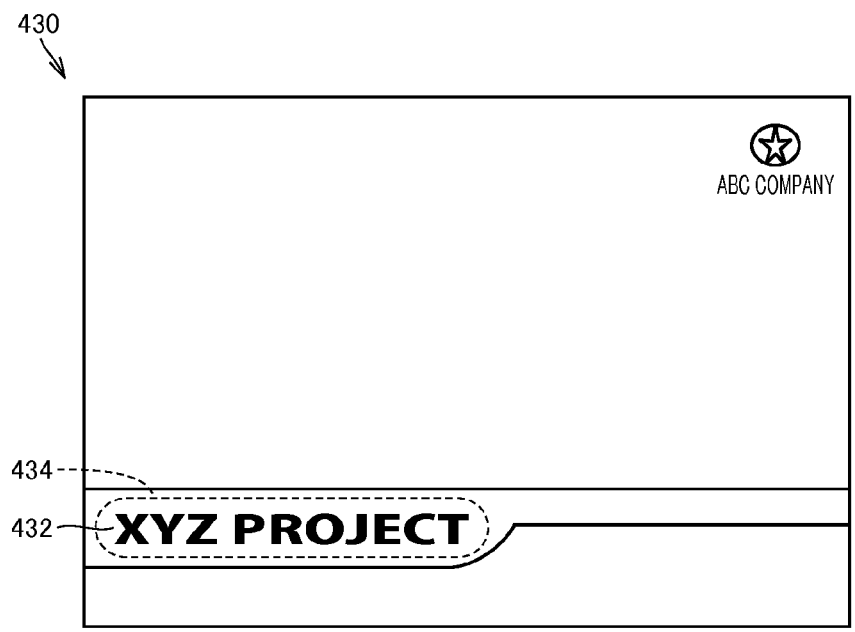
FIG. 13 shows an exemplary preview image in still another example.

FIG. 13 shows a preview image 430 displayed on display unit 1262 by information processing apparatus 100 in this case. When the user designates an image (hereinafter, referred to as "partial image") while viewing preview image 430, the color(s) of pixels included in the designated partial image can be designated as change-prohibited color(s).

FIG. 13 shows a case where the user designates, as partial image 432, the letters "XYZ project" illustrated in the lower left portion of FIG. 13. In the example of FIG. 13, the user surrounds desired partial image 432 with boundary line 434 in accordance with the manner illustrated in FIG. 12, thereby designating desired partial image 432.

Thus, with the user's designation of partial image 432 with boundary line 434, CPU 1266 of information processing apparatus 100 reads partial image 432 and receives the color(s) of the plurality of pixels in partial image 432 as change-prohibited color(s).

In the first embodiment, the manner of "designating change-prohibited color(s) based on a region" and the manner of "designating change-prohibited color(s) based on a partial image" are the same. A difference between the manner of "designating change-prohibited color(s) based on a region" and the manner of "designating change-prohibited color(s) based on a partial image" will be described below in a second embodiment.

Now, reference is made to FIG. 5 again. In a step S26, information processing apparatus 100 transmits the change-prohibited color designated by the user, to image formation apparatus 200A. The transmission of the change-prohibited color is implemented by, for example, information processing apparatus 100 transmitting YMCK data of the change-prohibited color to image formation apparatus 200A.

In a step S28, CPU 130 reads an emergency usable toner amount Ax of a toner restricted in use (toner not contained in toner hopper 129). Here, the emergency usable toner amount is set in advance for each of colors Y, M, C, B, and is stored in ROM 104, for example. Further, the emergency usable toner amounts for colors Y, M, C, B will be indicated by Ay, Am, Ac, Ab, respectively. Moreover, each of the emergency usable toner amounts is an amount of the toner with which developing unit 128 can perform development in a toner density not less than the normal density even when no toner is supplied from toner hopper 129. It is assumed that each of emergency usable toner amounts Ay, Am, Ac, Ab is 8 mg, for example.

Further, in step S28, calculation unit 1308 calculates a required toner amount a for a portion (hereinafter, referred to as "change-prohibited color portion") corresponding to the change-prohibited color. For example, when the user designates pixel 416a shown in FIG. 11, calculation unit 1308 calculates a toner amount a (required toner amount) of each color, which is required to print image 416 of the portion of the circle graph.

Moreover, in step S28, assuming that color change is made while maintaining the change-prohibited color, calculation unit 1308 calculates a toner amount b of each color, which is required to print a portion (hereinafter, "change-prohibited color excluding portion") other than the portion of the change-prohibited color. The following describes how calculation unit 1308 calculates toner amount b.

Calculation unit 1308 calculates required toner amount b, assuming that the color change is made in accordance with a predetermined rule and hue circle. Each of FIG. 14 to FIG. 19 shows an exemplary predetermined rule. The word "nonexistence" in each of FIG. 14 to FIG. 16 indicates that an amount of contained toner is "0". The word "shortage" in each of FIG. 14 to FIG. 16 indicates that the amount of contained toner is not "0" but will be "0" during printing.

FIG. 14 shows an exemplary rule in the case of printing letters/characters. FIG. 15 shows an exemplary rule in the case of printing a graph. FIG. 16 shows an exemplary rule in the case of printing a photograph.

Figure 17:
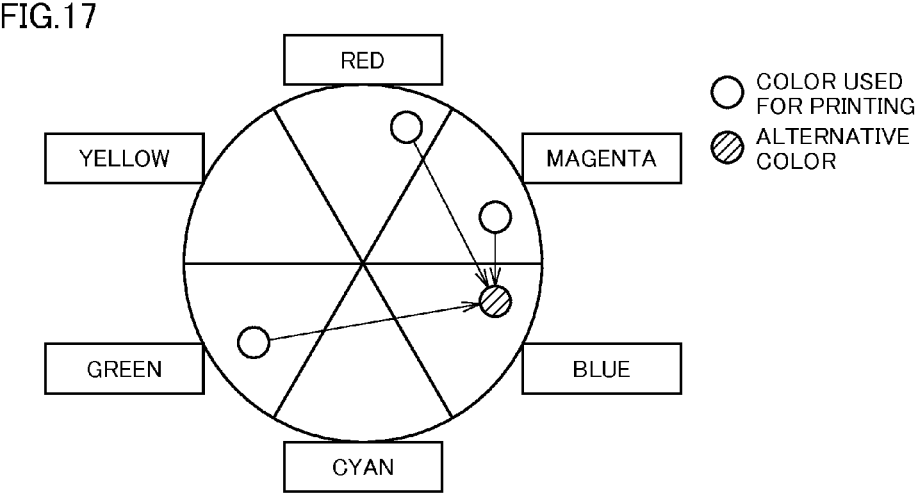
FIG. 17 shows an exemplary hue circle used in the rule shown in FIG. 14.
Figure 18:
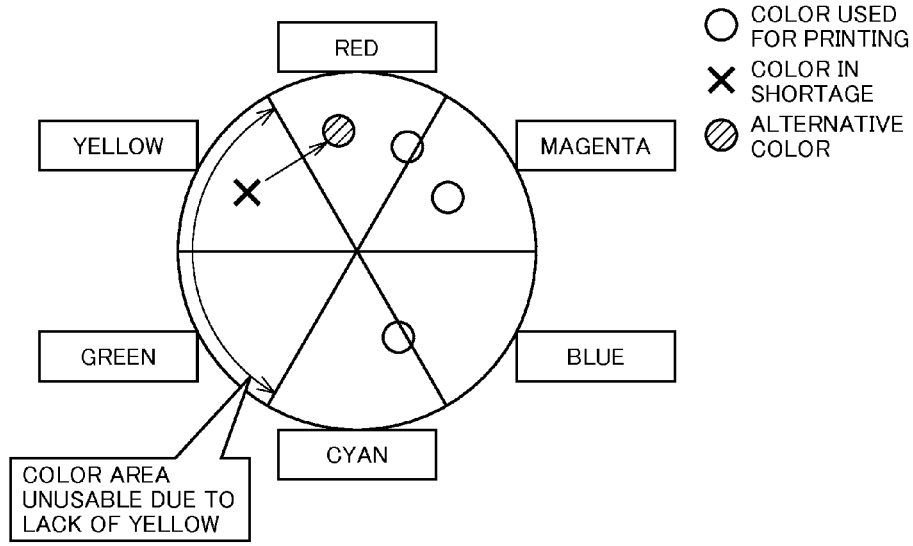
FIG. 18 shows an exemplary hue circle used in the rule shown in FIG. 14.
Figure 19:
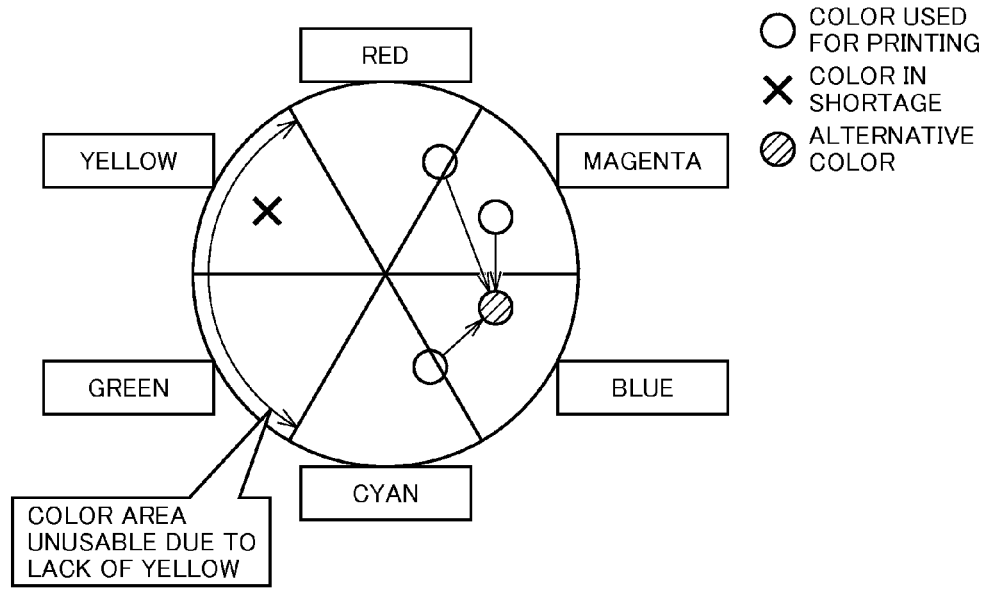
FIG. 19 shows an exemplary hue circle used in the rule shown in FIG. 15.

Each of FIG. 17 and FIG. 18 shows an exemplary hue circle used in the rule illustrated in FIG. 14. FIG. 19 shows an exemplary hue circle used in the rule illustrated in FIG. 15.

In the example of FIG. 14, for example, when the black toner is in shortage, print dot thinning is performed equally in the entire print data. In order to prevent deterioration of viewability due to too much thinning when thinning of 50% or more is performed, calculation unit 1308 follows the following rule: at least one of "yellow, magenta, and cyan" is mixed.

In the example of FIG. 15, for example, when the black toner is in shortage, a toner not in use and having the largest remaining amount is employed as an alternative color and printing is performed using the alternative color.

In the example of FIG. 16, for example, when the black toner is in shortage, monochrome printing is performed using a color having the largest remaining amount.

Thus, by using the rules or hue circles set by a designer of image formation apparatus 200A, calculation unit 1308 can assume appropriate color change. The rules and hue circles in FIG. 14 to FIG. 19 are just exemplary, and other rules and hue circles may be used.

Now, reference is made to FIG. 5 again. In step S28, calculation unit 1308 calculates a usage toner amount B (=a+b) by adding required toner amount a and required toner amount b. Required toner amount a is an amount of toner of each color, which is required for the change-prohibited color portion. Required toner amount b is an amount of toner of each color, which is required for the change-prohibited color excluding portion. Thus, usage toner amount B represents an amount of toner required in the printing involving the color change made in a reflection of the change-prohibited color. CPU 130 temporality stores the calculated usage toner amount Bx (x represents y, m, c, or k) of each color in RAM 106. Then, decision unit 1312 compares usage toner amount Bx of each color with emergency usable toner amount Ax of each color.

In a step S30, decision unit 1312 determines whether or not printing can be performed. Here, when decision unit 1312 determines that all of the colors satisfy the following formula (1) as a result of the comparison in step S28, decision unit 1312 determines that printing involving color change in a reflection of the change-prohibited color can be performed (YES in step S30). The process proceeds to a step S31.

$$Ax-Bx>0 \quad (1)$$

On the other hand, when decision unit 1312 determines that there are one or more colors that do not satisfy the above-described formula (1), decision unit 1312 determines that printing cannot be performed (NO in step S30). The process proceeds to a step S33.

In step S31, control unit 1302 causes image formation unit 122 to print the image based on the color change assumed in step S28 (color change in a reflection of the change-prohibited color). Specifically, control unit 1302 changes the print data and causes image formation unit 122 to print the image accordingly.

In a step S32, CPU 130 updates emergency usable toner amount Ax stored in ROM 104. Specifically, CPU 130 updates emergency usable toner amount Ax in accordance with the following formula (2):

$$Ax \leftarrow Ax-Bx \quad (2)$$

For example, the following describes a case where emergency usable toner amount Ax of each color before the printing in step S31 is 8 mg and 2 mg, 5 mg, 3 mg, and 2 mg of toners of C, M, Y, K are respectively consumed in step S31 as shown in FIG. 7. In this case, emergency usable toner amounts Ax of C, M, Y, K are updated to 6 mg, 3 mg, 5 mg, and 6 mg respectively, in accordance with the above-described formula (2). Then, each of emergency usable toner amounts Ax thus updated will be used in subsequent or later printing.

In step S33, when control unit 1302 determines that image formation unit 122 cannot perform an image formation process, control unit 1302 notifies the user of it. Specifically, in step S33, generation unit 1305 generates a printing-disapproved message, and transmits it to information processing apparatus 100.

In a step S34, when information processing apparatus 100 receives the printing-disapproved message, information processing apparatus 100 displays the printing-disapproved message on display unit 1262. In this way, control unit 1302 causes display unit 1262 of information processing apparatus 100 to display the printing-disapproved message, thereby notifying the user of the printing-disapproved message. Alternatively, information processing apparatus 100 may auditorily provide a notification of the printing-disapproved message.

Figure 20:
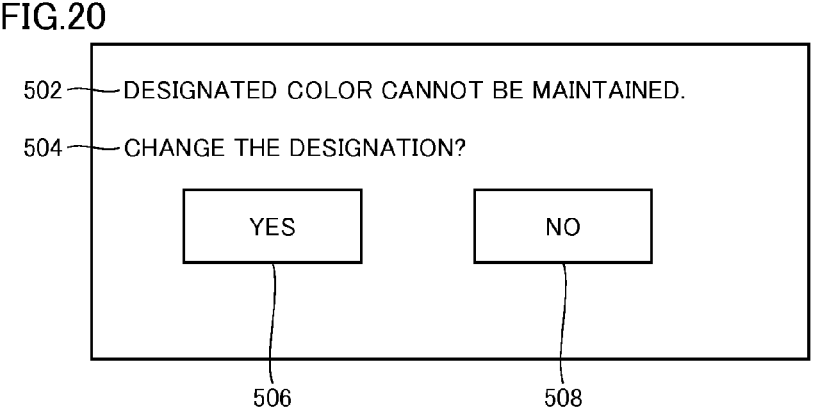
FIG. 20 shows an exemplary printing-disapproved message.

FIG. 20 shows an exemplary printing-disapproved message. The printing-disapproved message shown in FIG. 20 includes: a message 502 indicating that the change-prohibited color cannot be maintained; and a message 504 that urges to change the change-prohibited color previously designated (in step S24).

In the example of FIG. 20, message 502 indicating that the change-prohibited color cannot be maintained states "the designated color cannot be maintained". Meanwhile, message 504 as to whether to change the change-prohibited color states "Change the designation?". In this way, the user can have a room for changing the change-prohibited color.

In a step S36, CPU 1266 of information processing apparatus 100 determines whether to change the change-prohibited color. When the user wishes to change the change-prohibited color, the user performs a clicking or similar operation onto a YES button 506. When the user performs a clicking or similar operation onto YES button 506, CPU 1266 determines that the change-prohibited color is to be changed (YES in step S36). Then, the process returns to step S24. As described above, in step S24, CPU 1266 displays the selection screen shown in FIG. 10 again. In this way, CPU 1266 receives the change of the change-prohibited color.

On the other hand, when the user performs a clicking or similar operation onto a NO button 508, CPU 1266 determines that the change-prohibited color is not to be changed (NO in step S36). Accordingly, the printing is cancelled and the process is ended.

Thus, when control unit 1302 determines in step S30 that printing cannot be performed (NO in step S30), CPU 1266 preferably receives designation of change of the change-prohibited color again (steps S34, S36, S24). Hence, even when control unit 1302 determines in step S30 that printing cannot be performed, the printing may be performed with the change-prohibited color being changed by the user.

Image formation apparatus 200A of the first embodiment can receive the change-prohibited color from the user. Hence, even when a toner is restricted in use, image formation apparatus 200A can perform color-changed printing while maintaining the change-prohibited color. Accordingly, color change unintended for the user is not made. Thus, decrease in quality of resultant print product can be minimized for the user.

It should be noted that the module (reception unit 1304) that designates the change-prohibited color may be incorporated in a printer driver corresponding to image formation apparatus 200A. Further, the module that designates the change-prohibited color may be downloaded to information processing apparatus 100 as an application different from the printer driver.

Further, in the case where the designated image, which is designated by the job to be printed, is written in the XML (Extensible Markup Language), CPU 1266 of information processing apparatus 100 and control unit 1302 of image formation apparatus 200A may be adapted to distinguish the change-prohibited color portion and the change-prohibition excluding portion from each other, using tag information included in the XML.

Second Embodiment

The following describes a second embodiment. Information processing apparatus 100 may receive a job including a job for instructing an image formation process for a plurality of pages. In this case, in an image formation apparatus 200B of the second embodiment, the user can select an all-page mode or a single-page mode. The all-page mode is to perform color-changed printing while maintaining the change-prohibited color for all of the plurality of pages. The single-page mode is to perform color-changed printing while maintaining the change-prohibited color only for a portion designated as shown in FIG. 11 or the like.

Figure 21:
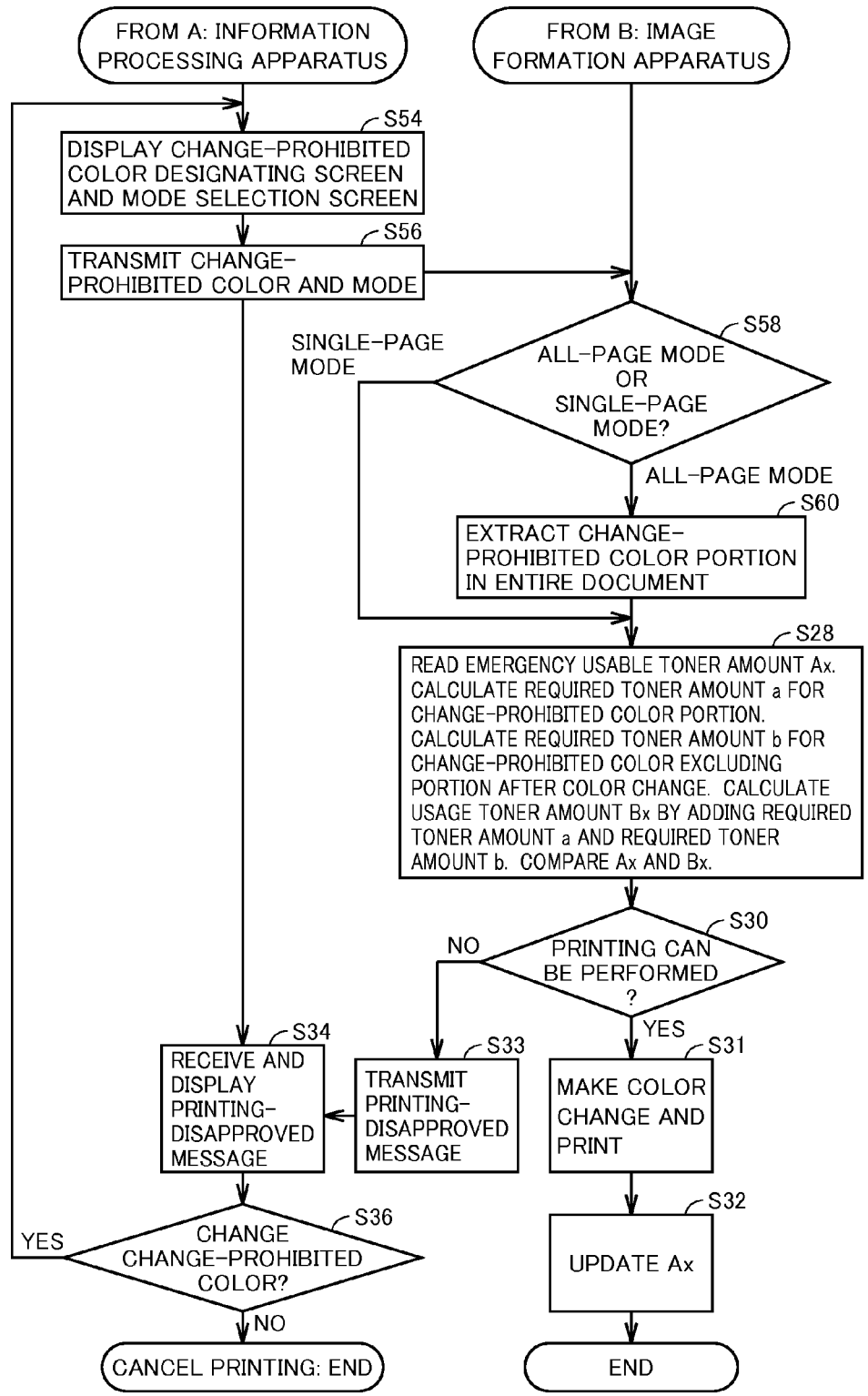
FIG. 21 shows an exemplary later part of a process flow in an image formation apparatus of a second embodiment.

FIG. 21 shows an example of a later part of a process flow in image formation apparatus 200B of the second embodiment. An earlier part of the process flow in image formation apparatus 200B of the second embodiment is the same as that in FIG. 4 and is therefore not described repeatedly. FIG. 21 is different from FIG. 5 in that steps S24, S26 are respectively replaced with steps S54, S56 and steps S58, S60 are added.

Meanwhile, the hardware configuration of image formation apparatus 200B and the exemplary function configuration of CPU 130 are respectively the same as the hardware configuration shown in FIG. 2 and the exemplary function configuration of CPU 130 shown in FIG. 3, and are therefore not described repeatedly.

In step S54 shown in FIG. 21, CPU 1266 of information processing apparatus 100 receives a change-prohibited color for the image of any one of FIG. 11 to FIG. 13, and then CPU 1266 of information processing apparatus 100 displays a mode selection screen for receiving the user's selection for the all-page mode or the single-page mode.

<As to Case of "Designating Change-Prohibited Color Based on Point">

Figure 22:
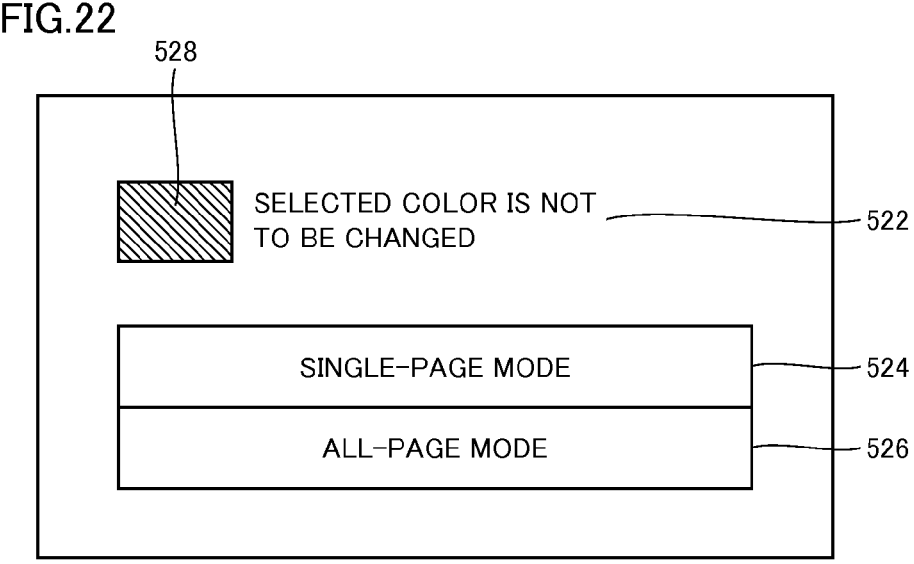
FIG. 22 shows an exemplary selection screen in the case of designating a change-prohibited color based on a point.

In the case of "designating a change-prohibited color based on a point" as shown in FIG. 11, when the user designates a pixel (point) in the preview image while viewing preview image 415, information processing apparatus 100 displays a selection screen shown in FIG. 22. FIG. 22 shows an exemplary selection screen in the case of "designating a change-prohibited color based on a point".

The mode selection screen shown in FIG. 22 includes: a message 522 indicating "the color of the selected portion is not to be changed"; a single-page mode button 524; and an all-page mode button 526. When the user wishes to select the single-page mode, the user performs a clicking or similar operation onto single-page mode button 524. Meanwhile, when the user wishes to select the all-page mode, the user performs a clicking or similar operation onto all-page mode button 526.

Further, in the example of FIG. 22, CPU 1266 displays change-prohibited color 528 within the mode selection screen. Accordingly, the user can check change-prohibited color 528.

In step S56, CPU 1266 transmits, to image formation apparatus 200B, the change-prohibited color and the mode (the all-page mode or the single-page mode) corresponding to the button onto which the clicking or similar operation has been performed.

In step S58, control unit 1302 of image formation apparatus 200B determines whether the mode thus transmitted in step S56 is the all-page mode or the single-page mode. When control unit 1302 determines that the mode is the all-page mode, the process proceeds to a step S60.

In step S60, control unit 1302 extracts the change-prohibited color portion in the entire document. Specifically, in the example of FIG. 11, from all of the plurality of pages of the document; control unit 1302 extracts a group of pixels having the same pixel color as that (change-prohibited color) of pixel 416a.

Accordingly, image formation apparatus 200B can print images while maintaining the color of the portion designated by the user and the color of the designated portions in the other pages. Other processes in step S28 are the same as those in the first embodiment, and are not described repeatedly.

<As to Case of "Designating Change-Prohibited Color(s) Based on Region">

Figure 23:
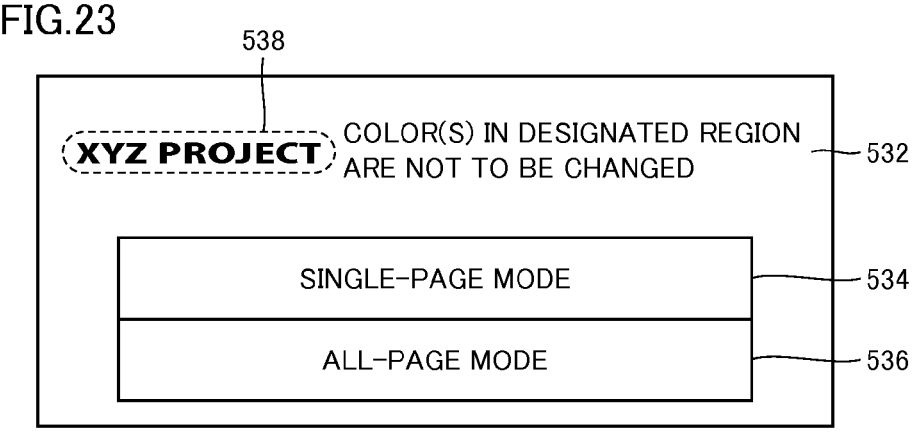
FIG. 23 shows an exemplary selection screen in the case of designating change-prohibited color(s) based on a region.

In the case of "designating change-prohibited color(s) based on a region" as shown in FIG. 12, when the user designates region 422 in the preview image while viewing preview image 418, information processing apparatus 100 displays a selection screen shown in FIG. 23. FIG. 23 shows an exemplary selection screen in the case of "designating change-prohibited color(s) based on a region".

The mode selection screen shown in FIG. 23 includes: a message 532 indicating "the color(s) of the selected region are not to be changed"; a single-page mode button 534; and an all-page mode button 536. When the user wishes to select the single-page mode, the user performs a clicking or similar operation onto single-page mode button 534. Meanwhile, when the user wishes to select the all-page mode, the user performs a clicking or similar operation onto all-page mode button 536.

Further, in the example of FIG. 23, in the mode selection screen, CPU 1266 displays image 538 located within the designated region. Accordingly, the user can check image 538 located within the designated region.

In step S56, CPU 1266 transmits, to image formation apparatus 200B, the change-prohibited color(s) and the mode corresponding to the button onto which the clicking or similar operation has been performed. Processes thereafter are the same as those described above, and are not described repeatedly.

Figure 24:
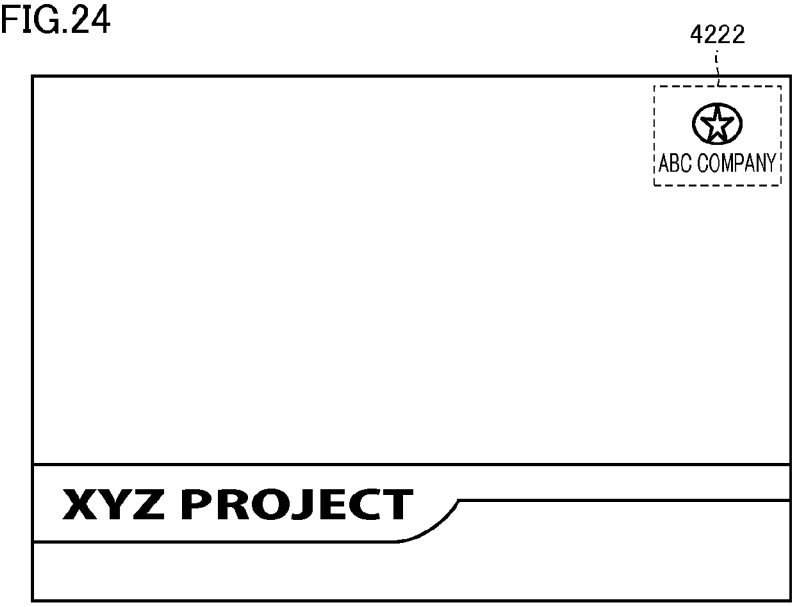
FIG. 24 shows an exemplary preview image in another example.

When the user selects the all-page mode in the case of "designating change-prohibited color(s) based on a region", in step S60, control unit 1302 calculates coordinates of region 422 shown in FIG. 12. Then, as shown in FIG. 24, control unit 1302 extracts, as a change-prohibited portion, a region 4222 disposed in another page and at the same coordinates as those of region 422. Accordingly, image formation apparatus 200B can print images while maintaining the color(s) of the region designated by the user and the color(s) of the regions at the same coordinates as those of the designated region in the other pages.

When the user selects the all-page mode in the case of "designating change-prohibited color(s) based on a region", image formation apparatus 200B can print the images while maintaining the color(s) of the logo mark disposed in the header or footer of each page, for example.

<As to Case of "Designating Change-Prohibited Color(s) Based on Image">

Figure 25:
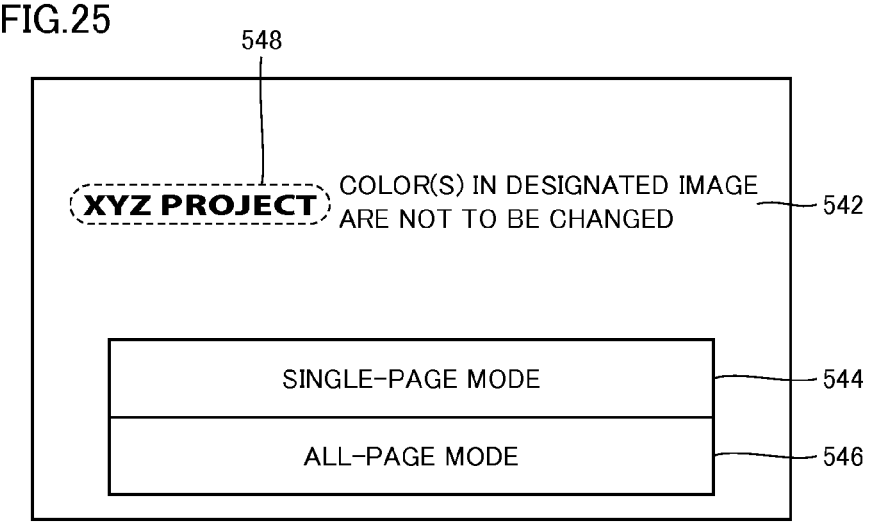
FIG. 25 shows an exemplary selection screen in the case of designating change-prohibited color(s) based on a partial image.

In the case of "designating change-prohibited color(s) based on an image (partial image)" as shown in FIG. 13, when the user designates a partial image 432 in the preview image while viewing preview image 418, information processing apparatus 100 displays a selection screen shown in FIG. 25. FIG. 25 shows an exemplary selection screen in the case of "designating change-prohibited color(s) based on a partial image".

The mode selection screen shown in FIG. 25 includes: a message 542 indicating "the color(s) of the selected partial image are not to be changed"; a single-page mode button 544; and an all-page mode button 546. When the user wishes to select the single-page mode, the user performs a clicking or similar operation onto single-page mode button 544. Meanwhile, when the user wishes to select the all-page mode, the user performs a clicking or similar operation onto all-page mode button 546.

Further, in the example of FIG. 25, CPU 1266 displays designated partial image 548 within the mode selection screen. Accordingly, the user can check partial image 548.

Figure 26:
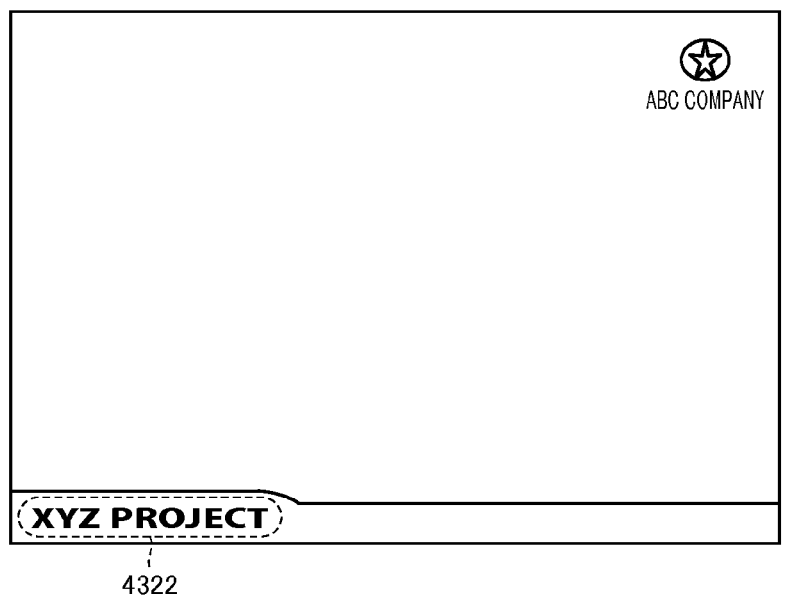
FIG. 26 shows an exemplary preview image in another example.

When the user selects the all-page mode in the case of "designating change-prohibited color(s) based on an image", in step S60, control unit 1302 obtains the shape of partial image 432 shown in FIG. 13. Then, as illustrated in FIG. 26, control unit 1302 extracts, as a change-prohibited portion, a partial image 4322 disposed in another page and having a similar shape as that of partial image 432. Here, the phrase "similar shape" is intended to include a similar shape different in size, and a similar shape different in coordinates (location). Accordingly, image formation apparatus 200B can print images while maintaining the color(s) of the partial image designated by the user and the color(s) of the partial images disposed in the other pages and having a similar shape to that of the designated partial image.

When the user selects the all-page mode in the case of "designating change-prohibited color(s) based on an image", image formation apparatus 200B can print the images while maintaining the color(s) of all the logo marks disposed in each of the pages, for example.

Third Embodiment

The following describes an image formation apparatus 200C of a third embodiment. As illustrated in FIG. 11 to FIG. 13, image formation apparatus 200A of the first embodiment displays a preview image for the user, and receives designation of a change-prohibited color in the preview image. Image formation apparatus 200C of the third embodiment does not display such a preview image, but is adapted to cause the user to input a change-prohibited color.

The hardware configuration of image formation apparatus 200C of the third embodiment is the same as the hardware configuration shown in FIG. 2. An exemplary function configuration of the CPU is the same as the exemplary function configuration shown in FIG. 3. A process flow is the same as that in FIG. 4 and FIG. 5. Hence, they are not described repeatedly.

Figure 27:
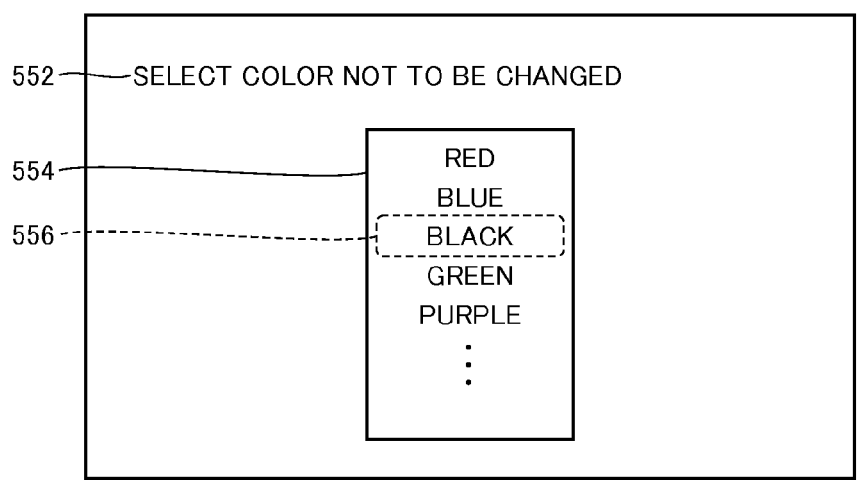
FIG. 27 shows an exemplary change-prohibited color selection screen.

FIG. 27 shows an exemplary change-prohibited color selection screen displayed on display unit 1262 by CPU 1266 in accordance with an instruction from image formation apparatus 200C (reception unit 1304), in step S24 (see FIG. 5).

The change-prohibited color selection screen shown in FIG. 27 includes: a message 552 that urges the user to select a color not to be changed; and a selection region 554 that displays a plurality of candidate colors from which a change-prohibited color is selected. The user uses operation unit 1264 to move cursor 556 to select a desired change-prohibited color.

In step S26, information processing apparatus 100 transmits data regarding the selected change-prohibited color to image formation apparatus 200.

When the print image is a text image or includes many text images, the user may wish to cause image formation apparatus 200C to perform printing while maintaining a portion having been revised with letters/characters in red (i.e., red color), for example. In such a case, the user can intuitively select the change-prohibited color.

Fourth Embodiment

The following describes a fourth embodiment. An image formation apparatus 200D is described. Each of image formation apparatuses 200B, 200C described above performs printing while maintaining the same color as a designated or selected change-prohibited color. Image formation apparatus 200D of the fourth embodiment prints an image while maintaining at least one of a designated or selected change-prohibited color and a color approximate to the change-prohibited color (hereinafter, referred to as "change-prohibited approximate color").

In this fourth embodiment, it is assumed that the change-prohibited color is indicated by a value of CMYK (0 to 255). In this case, a margin is determined in advance for each of CMYK. Then, image formation apparatus 200D performs printing while also maintaining, as the change-prohibited approximate color, a color falling within the margin of each of CMYK for the designated or selected change-prohibited color.

Image formation apparatus 200D of the fourth embodiment prints the image while maintaining at least one of the change-prohibited color and the change-prohibited approximate color. Accordingly, image formation apparatus 200D can prevent erroneous determination on color.

Fifth Embodiment

Figure 28:
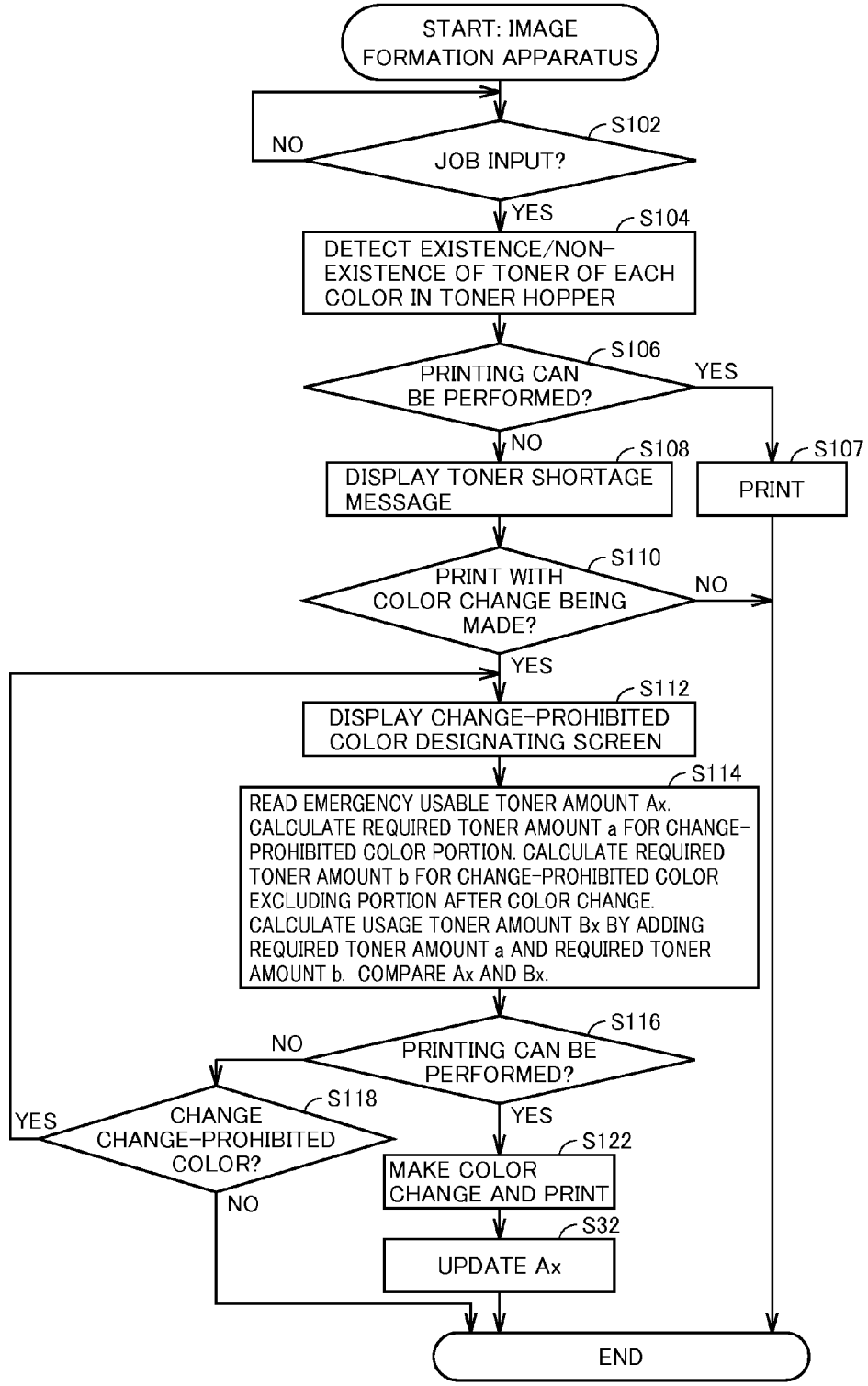
FIG. 28 shows an exemplary process flow in an image formation apparatus of a fifth embodiment.

The following describes an image formation apparatus 200E of a fifth embodiment. In each of the first embodiment to the fourth embodiment described above, the image formation system including information processing apparatus 100 and one of image formation apparatuses 200A to 200D has been illustrated. In the fifth embodiment, referring to FIG. 28, a process performed solely by image formation apparatus 200E will be described. FIG. 28 shows an exemplary process flow in image formation apparatus 200E. The hardware configuration of image formation apparatus 200E is the same as the hardware configuration shown in FIG. 2. An exemplary function configuration of CPU 130 is the same as the exemplary function configuration shown in FIG. 3. Hence, they are not described repeatedly.

Now, correspondences between the step numbers in FIG. 28 and the step numbers in FIG. 4 and FIG. 5 will be described. In the description below, for example, in the case where step S104 in FIG. 28 corresponds to step S6 in FIG. 4 and FIG. 5, the correspondence is indicated as follows: (S104, S6). Thus, the correspondences between the step numbers in FIG. 28 and the step numbers in FIG. 4 and FIG. 5 are indicated as follows: (S102, S4), (S104, S6), (S106, S8), (S108, S12), (S110, S14), (S112, S24), (S114, S28), (S116, S30), (S118, S36), and (S122, S31).

In step S102, control unit 1302 determines whether or not the user has input a job to image formation apparatus 200E. Examples of the input of the job from the user include: pressing down of a print button of operation unit 1263 with a document being set at automatic document transportation unit 118 by the user. When control unit 1302 determines that the job has been input (YES in step S102), the process proceeds to step S104.

In step S104, calculation unit 1308 calculates a required toner amount based on the job. Further, detection unit 1310 detects an amount of contained toner. Decision unit 1312 compares the required toner amount with the amount of contained toner.

In step S106, based on the result of comparison, decision unit 1312 determines whether or not printing can be performed. When decision unit 1312 determines that printing can be performed (YES in step S106), image formation unit 122 performs printing in step S107 as instructed by the job. Then, the process is ended.

On the other hand, when decision unit 1312 determines that printing cannot be performed (NO in step S106), the process proceeds to step S108. In step S108, control unit 1302 displays the toner shortage message (see FIG. 8) on display unit 1261. The user makes a selection as to whether to print the image with color change being made.

When control unit 1302 determines that the user has provided an input to make no color change (NO in step S110), the process is ended. On the other hand, when control unit 1302 determines that the user has provided an input to print the image with the color change being made (YES in step S110), the process proceeds to step S112.

In step S112, reception unit 1304 displays a change-prohibited color designating screen (FIG. 9, FIG. 10, or the like). When reception unit 1304 receives designation of a change-prohibited color, in step S114, decision unit 1312 compares emergency usable toner amount Ax with usage toner amount Bx.

In step S116, decision unit 1312 determines whether or not the image can be printed. When decision unit 1312 determines that the image can be printed (YES in step S116), control unit 1302 causes image formation unit 122 to perform an image formation process with the color change being made while maintaining the change-prohibited color.

On the other hand, when decision unit 1312 determines that the image cannot be printed (NO in step S116), the process proceeds to step S118.

In step S118, reception unit 1304 displays a printing-disapproved message (see FIG. 20) on display unit 1261. When control unit 1302 determines that the user has provided an input to change the change-prohibited color (YES in step S118), the process returns to step S112. On the other hand, when control unit 1302 determines that the user has provided an input not to change the change-prohibited color (NO in step S118), the process is ended.

Such an image formation apparatus 200E of the fifth embodiment can solely perform printing involving color change while maintaining a change-prohibited color received from and designated by the user.

Other Embodiment

In each of the above-described embodiments, it has been illustrated that containing unit 140 includes developing unit 128 and toner hopper 129. As another example thereof, containing unit 140 may be adapted to include another configuration.

Further, the case where a part of the developers of the plurality of colors is restricted in use includes a case where decision unit 1312 determines that a remaining amount of the part of the developers is less than a predetermined value G set in advance. In the example above, predetermined value G is emergency usable toner amount Ax.

Further, the case where the part of developers of the plurality of colors is restricted in use may correspond to a case where an amount of a toner contained in the containing unit is less than an amount of toner to be used.

Further, in the description above, it has been illustrated that the "developer restricted in use" is a toner in shortage. The following describes another example of the "toner restricted in use". Now, it is assumed that there is an image formation apparatus that performs control such that toners of respective colors are consumed completely at substantially the same time. Such an image formation apparatus needs to use a toner having a larger content (remaining amount), prior to a toner having a smaller content. Hence, in this image formation apparatus, such a toner having a smaller content is regarded as the "toner restricted in use".

Meanwhile, in the case where each of toners of respective colors has an expiry date, a toner having the most distant expiry date is regarded as the "toner restricted in use" among the toners of respective colors.

Further, in the case where a toner restricted in use has been known in advance, identification information for identifying the toner restricted in use may be stored in EEPROM 108. In this case, control unit 1302 may be adapted to perform a process, assuming that the toner indicated by the identification information is regarded as the "toner restricted in use". In this case, determination unit 1306 may not be provided.

Further, the image formation apparatus according to the present embodiment is implemented by the CPU and the program executed thereon. The program implementing the present embodiment can be stored in a computer-readable storage medium, such as a semiconductor memory, a hard disk, a CD-ROM, or a DVD. The program is provided by means of such a storage medium having the program stored therein, or is provided by means of transmission/reception employing a network via a communication interface.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A color image formation apparatus comprising:
   a containing unit configured to contain a plurality of developers of different colors;
   an image formation unit configured to perform an image formation process using at least a part of said plurality of developers;
   a control unit configured to cause said image formation unit to perform the image formation process by changing at least one color of a plurality of colors designated by a job to be processed to an alternative color, such that the image formation process is able to be performed using a developer that is not restricted for use when a part of said plurality of developers for processing the changed color is restricted; and
   a reception unit configured to receive a designation of a change-prohibited color, which is a color not to be changed to an alternative color by said control unit,
   said control unit being configured to cause the image formation process to be performed for said job while prohibiting said change-prohibited color of the colors designated by said job from being changed.

2. The color image formation apparatus according to claim 1, wherein:
   said job to be processed includes a job that instructs the image formation process for a plurality of pages; and
   said control unit is configured to selectively perform an operation in a mode of maintaining said change-prohibited color for all of said plurality of pages, or an operation in a mode of maintaining said change-prohibited color for a designated page of said plurality of pages.

3. The color image formation apparatus according to claim 1, wherein said reception unit is configured to provide a notification that urges to change said change-prohibited color designated previously, when said image formation unit is not able to perform the image formation process with said change-prohibited color being maintained for said job.

4. The color image formation apparatus according to claim 1, wherein said reception unit is configured to display, on a display unit, a preview image of said job to be processed, and to receive said designation of said change-prohibited color based on the preview image.

5. The color image formation apparatus according to claim 4, wherein said reception unit is configured to receive a color of a pixel designated in said preview image as said designation of said change-prohibited color.

6. The color image formation apparatus according to claim 4, wherein said reception unit is configured to receive a color within a region designated in said preview image as said designation of said change-prohibited color.

7. The color image formation apparatus according to claim 4, wherein said reception unit is configured to receive a color of a partial image designated in said preview image as said designation of said change-prohibited color.

8. The color image formation apparatus according to claim 1, wherein said reception unit is configured to display, on a display unit, an image for receiving selection of said change-prohibited color.

9. The color image formation apparatus according to claim 1, wherein the part of said plurality of developers is restricted in use when a remaining amount of the part of the developers is less than a predetermined amount set in advance.

10. The color image formation apparatus according to claim 1, wherein said change-prohibited color includes a color approximate to said change-prohibited color.

11. A color image formation system comprising:
    a color image formation apparatus; and
    an information processing apparatus configured to transmit a job to be processed, to said color image formation apparatus,
    said color image formation apparatus including
       a containing unit configured to contain a plurality of developers of different colors,
       an image formation unit configured to perform an image formation process using at least a part of said plurality of developers, and
       a control unit configured to cause said image formation unit to perform the image formation process by changing at least one color of a plurality of colors designated by said job to be processed to an alternative color, such that the image formation process is able to be performed using a developer that is not restricted for use when a part of said plurality of developers for processing the changed color is restricted in use,
    said information processing apparatus including a reception unit configured to receive a designation of a change-prohibited color, which is a color not to be changed by said control unit,
    said control unit being configured to cause the image formation process to be performed for said job while prohibiting said change-prohibited color of the colors designated by said job to be changed.

12. A color image processing method employing at least a part of a plurality of contained developers of different colors, comprising:
    changing at least one color of a plurality of colors designated by a job to be processed to an alternative color, such that an image formation process is able to be performed using a developer that is not restricted for use when a part of said plurality of developers is restricted;
    receiving a designation of a change-prohibited color, which is a color not to be changed; and
    processing said job, by a color image formation device, by changing the at least one color to the alternative color and prohibiting said change-prohibited color of the colors designated by said job from being changed, when said change-prohibited color is designated.

13. A non-transitory storage medium having an image processing program stored therein for performing an image formation process using at least a part of a plurality of contained developers of different colors,
    said image processing program causing a computer to:
       change at least one color of a plurality of colors designated by a job to be processed to an alternative color, such that the image formation process is able to be performed using a developer not restricted for use when a part of said plurality of developers is restricted in use; and
       receive a designation of a change-prohibited color, which is a color not to be changed,
    processing said job by changing the at least one color to the alternative color and prohibiting said change-prohibited color of the colors designated by said job to be changed, when said change-prohibited color is designated.

* * * * *